(12) United States Patent
Suzuki et al.

(10) Patent No.: US 10,843,527 B2
(45) Date of Patent: Nov. 24, 2020

(54) VEHICLE AIR CONDITIONING DEVICE

(71) Applicant: SANDEN AUTOMOTIVE CLIMATE SYSTEMS CORPORATION, Isesaki (JP)

(72) Inventors: Kenichi Suzuki, Isesaki (JP); Ryo Miyakoshi, Isesaki (JP); Kohei Yamashita, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 0 days.

(21) Appl. No.: 16/076,963

(22) PCT Filed: Feb. 21, 2017

(86) PCT No.: PCT/JP2017/008043
§ 371 (c)(1),
(2) Date: Aug. 9, 2018

(87) PCT Pub. No.: WO2017/146270
PCT Pub. Date: Aug. 31, 2017

(65) Prior Publication Data
US 2019/0047362 A1    Feb. 14, 2019

(30) Foreign Application Priority Data
Feb. 26, 2016    (JP) ................ 2016-035678

(51) Int. Cl.
*B60H 1/00*    (2006.01)
*F25B 40/00*    (2006.01)
(Continued)

(52) U.S. Cl.
CPC ..... *B60H 1/00907* (2013.01); *B60H 1/00385* (2013.01); *B60H 1/00564* (2013.01);
(Continued)

(58) Field of Classification Search
CPC . F25B 5/04; F25B 41/04; F25B 40/00; B60H 1/00907; B60H 1/3228;
(Continued)

(56) References Cited

U.S. PATENT DOCUMENTS 5,228,301 A * 7/1993 Sjoholm ............ B60H 1/00007
165/263
5,299,431 A * 4/1994 Iritani ................ B60H 1/00021
62/243

(Continued)

FOREIGN PATENT DOCUMENTS

JP    9-295506    11/1997
JP    2013-023210    2/2013
(Continued)

OTHER PUBLICATIONS

Office Action dated Feb. 4, 2020 issued in Japanese Patent Application No. 2016-035678.

*Primary Examiner* — Ljiljana V. Ciric
(74) *Attorney, Agent, or Firm* — Cozen O'Connor

(57) ABSTRACT

A vehicle air conditioner has a bypass pipe which passes a radiator, an outdoor expansion valve, and opening/closing valves. A controller is configured to execute a heating mode to open a first solenoid valve and close a second solenoid valve, and a dehumidifying and heating mode to close the first solenoid valve, open the second solenoid valve, let a refrigerant radiate heat in an outdoor heat exchanger, let the refrigerant absorb heat in a heat absorber, and generate heat in an auxiliary heater. When changing from the heating mode to the dehumidifying and heating mode, the controller sends the refrigerant to a receiver drier, controls a compressor to reduce a difference between pressures before and after the second solenoid valve, opens the second solenoid valve, closes the first solenoid valve, shuts off the outdoor expan- (Continued)

sion valve, and shifts the compressor to control in the dehumidifying and heating mode.

7 Claims, 8 Drawing Sheets

(51) Int. Cl.
    *F25B 41/04*     (2006.01)
    *B60H 1/32*     (2006.01)
    *F25B 5/04*     (2006.01)
    *B60H 1/22*     (2006.01)
    *B60H 3/02*     (2006.01)

(52) U.S. Cl.
    CPC ..... *B60H 1/00571* (2013.01); *B60H 1/00885* (2013.01); *B60H 1/00921* (2013.01); *B60H 1/22* (2013.01); *B60H 1/3228* (2019.05); *B60H 3/02* (2013.01); *F25B 5/04* (2013.01); *F25B 40/00* (2013.01); *F25B 41/04* (2013.01); *B60H 1/3213* (2013.01); *B60H 2001/006* (2013.01); *B60H 2001/224* (2013.01); *B60H 2001/3238* (2013.01); *B60H 2001/3248* (2013.01); *B60H 2001/3288* (2013.01)

(58) Field of Classification Search
    CPC .. B60H 1/00921; B60H 3/02; B60H 1/00885; B60H 1/00571; B60H 1/00564; B60H 1/00385; B60H 1/22; B60H 2001/3288; B60H 2001/3248; B60H 2001/3238; B60H 2001/224; B60H 2001/006; B60H 1/3213

See application file for complete search history.

(56) References Cited

U.S. PATENT DOCUMENTS

| | | | | |
|---|---|---|---|---|
| 6,047,770 | A * | 4/2000 | Suzuki | B60H 1/00007 165/202 |
| 6,347,528 | B1 * | 2/2002 | Iritani | B60H 1/00357 62/324.6 |
| 6,430,951 | B1 * | 8/2002 | Iritani | B60H 1/00021 62/229 |
| 6,588,222 | B1 * | 7/2003 | Urbank | B60H 1/3205 62/127 |
| 9,222,710 | B2 * | 12/2015 | Katayama | B60H 1/00921 |
| 9,581,370 | B2 * | 2/2017 | Inaba | B60H 1/00899 |
| 9,797,641 | B2 * | 10/2017 | Suzuki | B60H 1/00785 |
| 9,810,465 | B2 * | 11/2017 | Kang | F25B 5/00 |
| 9,895,956 | B2 * | 2/2018 | Satou | B60H 1/3204 |
| 9,909,794 | B2 * | 3/2018 | Suzuki | F25B 47/022 |
| 10,214,072 | B2 * | 2/2019 | Miyakoshi | B60H 1/00785 |
| 10,239,382 | B2 * | 3/2019 | Miyakoshi | B60H 1/00385 |
| 10,252,600 | B2 * | 4/2019 | Miyakoshi | F25B 49/02 |
| 10,315,485 | B2 * | 6/2019 | Miyakoshi | B60H 1/00035 |
| 10,525,794 | B2 * | 1/2020 | Suzuki | B60H 1/00392 |
| 10,562,375 | B2 * | 2/2020 | Suzuki | B60H 1/2221 |
| 2004/0079096 | A1 * | 4/2004 | Itoh | B60H 1/00735 62/223 |
| 2008/0196877 | A1 * | 8/2008 | Zeigler | B60H 1/00907 165/202 |
| 2011/0016896 | A1 * | 1/2011 | Oomura | B60H 1/00785 62/155 |
| 2011/0167850 | A1 * | 7/2011 | Itoh | B60H 1/00914 62/160 |
| 2012/0255319 | A1 * | 10/2012 | Itoh | F24F 3/1405 62/160 |
| 2013/0139528 | A1 * | 6/2013 | Katayama | B60H 1/00921 62/81 |
| 2013/0312447 | A1 * | 11/2013 | Inaba | F25B 43/00 62/324.6 |
| 2014/0338382 | A1 * | 11/2014 | Miyakoshi | F25B 5/00 62/159 |
| 2014/0352341 | A1 * | 12/2014 | Hamamoto | B60H 1/22 62/243 |
| 2015/0300706 | A1 * | 10/2015 | Awa | F25B 29/003 62/324.6 |
| 2015/0314668 | A1 * | 11/2015 | Suzuki | F25B 1/10 62/160 |
| 2016/0084554 | A1 * | 3/2016 | Suzuki | F25B 47/022 62/160 |
| 2016/0084555 | A1 * | 3/2016 | Suzuki | F25B 47/022 62/151 |
| 2016/0185185 | A1 * | 6/2016 | Suzuki | B60H 1/00921 237/5 |
| 2016/0193896 | A1 * | 7/2016 | Miyakoshi | B60H 1/00385 62/155 |
| 2016/0201960 | A1 * | 7/2016 | Miyakoshi | B60H 1/00385 62/154 |
| 2016/0201961 | A1 * | 7/2016 | Miyakoshi | B60H 1/00921 62/133 |
| 2016/0318373 | A1 * | 11/2016 | Kang | F25B 5/00 |
| 2016/0332505 | A1 * | 11/2016 | Yamanaka | B60L 1/003 |
| 2017/0217288 | A1 * | 8/2017 | Suzuki | B60H 1/2221 |
| 2017/0274725 | A1 * | 9/2017 | Miyakoshi | B60H 1/00035 |
| 2017/0282689 | A1 * | 10/2017 | Miyakoshi | F25B 49/02 |
| 2018/0141409 | A1 * | 5/2018 | Miyakoshi | B60H 1/00921 |
| 2018/0141411 | A1 * | 5/2018 | Miyakoshi | B60H 1/2225 |
| 2018/0156509 | A1 * | 6/2018 | Tada | B60H 1/00921 |
| 2018/0178629 | A1 * | 6/2018 | Suzuki | B60H 1/00921 |
| 2018/0194191 | A1 * | 7/2018 | Suzuki | B60H 1/3216 |
| 2018/0201088 | A1 * | 7/2018 | Nomura | F25B 47/02 |
| 2018/0209708 | A1 * | 7/2018 | Miyakoshi | F25B 47/022 |
| 2018/0297446 | A1 * | 10/2018 | Miyakoshi | B60H 1/2221 |
| 2018/0354342 | A1 * | 12/2018 | Miyakoshi | B60H 1/00921 |
| 2018/0354343 | A1 * | 12/2018 | Suzuki | B60H 1/00921 |
| 2018/0361828 | A1 * | 12/2018 | Kato | F25B 5/04 |
| 2018/0370329 | A1 * | 12/2018 | Ishizeki | B60H 1/0073 |
| 2019/0023100 | A1 * | 1/2019 | Suzuki | F25B 41/043 |
| 2019/0030989 | A1 * | 1/2019 | Miura | B60H 1/3213 |
| 2019/0047362 | A1 * | 2/2019 | Suzuki | B60H 1/00921 |
| 2019/0070933 | A1 * | 3/2019 | Ishizeki | B60H 1/2225 |
| 2019/0077222 | A1 * | 3/2019 | Ishizeki | B60H 1/3216 |
| 2019/0077223 | A1 * | 3/2019 | Ishizeki | B60H 1/22 |
| 2019/0202266 | A1 * | 7/2019 | Ishizeki | B60H 1/22 |
| 2019/0344636 | A1 * | 11/2019 | Lee | B60H 1/3228 |
| 2019/0353407 | A1 * | 11/2019 | Miyakoshi | B60H 1/00921 |

FOREIGN PATENT DOCUMENTS

| | | |
|---|---|---|
| JP | 2014-62675 | 4/2014 |
| JP | 2014-094671 | 5/2014 |
| JP | 2015-39999 | 3/2015 |

* cited by examiner

VEHICLE AIR CONDITIONING DEVICE

RELATED APPLICATIONS

This is a U.S. National Phase application under 35 USC 371 of International Application PCT/JP2017/008043 filed on Feb. 21, 2017.

This application claims the priority of Japanese application no. 2016-035678 filed Feb. 26, 2016, the entire content of which is hereby incorporated by reference.

TECHNICAL FIELD

The present invention relates to an air conditioning device of a heat pump system which conditions air of a vehicle interior, and more particularly, it relates to an air conditioning device which is applicable to a hybrid car and an electric vehicle.

BACKGROUND ART

To cope with enhancement of environmental problems in recent years, hybrid cars and electric vehicles have spread. As an air conditioning device which is applicable to such a vehicle, there has been developed an air conditioning device comprising a compressor to compress and discharge a refrigerant; an internal condenser disposed on the side of a vehicle interior to let the refrigerant radiate heat; an evaporator disposed on the side of the vehicle interior to let the refrigerant absorb heat; an external condenser disposed outside the vehicle interior to let the refrigerant radiate or absorb heat; a first expansion valve to expand the refrigerant which flows into this external condenser; a second expansion valve to expand the refrigerant which flows into the evaporator; a pipe which bypasses the internal condenser and the first expansion valve; and a first valve which switches between flowing the refrigerant discharged from the compressor to the internal condenser and directly flowing the refrigerant to the external condenser from the pipe, bypassing the internal condenser and the first expansion valve; and thus, in the above constitution, a heating mode, a dehumidifying mode and a cooling mode are switched among these modes; and the heating mode comprises flowing the refrigerant discharged from the compressor to the internal condenser by the first valve to radiate heat, depressurizing the refrigerant from which the heat has been radiated, by the first expansion valve, and absorbing heat in the external condenser; the dehumidifying mode comprises letting the refrigerant discharged from the compressor radiate heat in the internal condenser by the first expansion valve, depressurizing the refrigerant from which the heat has been radiated, by the second expansion valve, and absorbing heat in the evaporator; and the cooling mode comprises flowing the refrigerant discharged from the compressor to the external condenser by the first valve, bypassing the internal condenser and the first expansion valve, thereby radiating the heat, depressurizing in the second expansion valve, and absorbing heat in the evaporator (e.g., see Patent Document 1).

Furthermore, although not described in Patent Document 1 mentioned above, in this type of vehicle air conditioning device, an accumulator is usually disposed on a refrigerant suction side of the compressor, and a constitution is employed in which especially in the heating mode, the refrigerant is once stored in this accumulator to perform gas-liquid separation, and the gas refrigerant is sucked into the compressor, thereby preventing or inhibiting liquid return to the compressor. Additionally, a header portion (a receiver) is disposed on a refrigerant downstream side of an outdoor heat exchanger, and a constitution is employed in which in an operation mode for dehumidifying and heating, dehumidifying and cooling, or cooling, the refrigerant flowing out from the outdoor heat exchanger is once received in this header portion (e.g., see Patent Document 2).

CITATION LIST

Patent Documents

Patent Document 1: Japanese Patent Application Publication No. 2013-23210

Patent Document 2: Japanese Patent Application Publication No. 2014-94671

SUMMARY OF THE INVENTION

Problems to be Solved by the Invention

Here, a refrigerant and oil flowing out from a compressor through a refrigerant circuit flow into an accumulator, their liquid parts accumulate in the accumulator, and the oil having a small specific weight forms a layer on the refrigerant having a liquid state, to make a lid thereon. Furthermore, in a heating mode to be executed in an environment where an outdoor air temperature is low, there increase amounts of the liquid refrigerant and oil flowing out from an outdoor heat exchanger into the accumulator and accumulating in the accumulator, and hence an oil surface (a liquid surface in the accumulator) rises up to the vicinity of an outlet of the accumulator.

When an operation mode changes to another mode (dehumidifying and heating, dehumidifying and cooling, or cooling) in this state, the refrigerant flowing out from the outdoor heat exchanger flows through a receiver, and hence the refrigerant accumulated in the accumulator moves to the receiver. Consequently, pressure in the accumulator rapidly drops. When the pressure in the accumulator rapidly drops in this manner, a phenomenon referred to as so-called bumping occurs where the refrigerant below the oil boils and vaporizes without stopping, and intensely breaks through the upper oil layer. Particularly, when a number of revolution of the compressor heightens in an early stage after the mode is changed, the pressure in the accumulator also rapidly drops to easily cause the bumping.

Then, when this bumping intensifies, a lot of liquid refrigerant in the accumulator is pushed out from the outlet, excessive liquid return to the compressor accordingly occurs, and liquid compression impairs reliability of the compressor. Additionally, the bumping phenomenon in the accumulator generates a comparatively large noise, and hence there is also the problem that comfort of a passenger is impaired by the generation of the noise.

The present invention has been developed to solve such conventional technical problems, and an object thereof is to inhibit liquid return and generation of noise in an accumulator, when a heating mode is changed to another operation mode, in a vehicle air conditioning device including a bypass pipe which passes a radiator and an outdoor expansion valve, and an opening/closing valve to switch between flow channels.

Means for Solving the Problems

A vehicle air conditioning device according to item 1 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve interposed between a discharge side of the compressor and an inlet side of the radiator, a bypass pipe branching on an upstream side of this opening/closing valve, passing the radiator and the outdoor expansion valve, to send, to the outdoor heat exchanger, the refrigerant discharged from the compressor, a second opening/closing valve disposed in this bypass pipe, an auxiliary heating device to heat the air to be supplied from the air flow passage to the vehicle interior, an accumulator connected to a refrigerant suction side of the compressor, a receiver connected to a refrigerant downstream side of the outdoor heat exchanger, and a control device, so that the control device switches between and executes a heating mode to open the first opening/closing valve, close the second opening/closing valve, send, to the radiator, the refrigerant discharged from the compressor, let the refrigerant radiate heat, decompress, in the outdoor expansion valve, the refrigerant from which the heat has been radiated, let the refrigerant absorb heat in the outdoor heat exchanger, send, to the accumulator, the refrigerant by which the heat has been absorbed, and suck the refrigerant from this accumulator into the compressor, a dehumidifying and heating mode to shut off the outdoor expansion valve, close the first opening/closing valve, open the second opening/closing valve, send, to the outdoor heat exchanger, the refrigerant discharged from the compressor by the bypass pipe, let the refrigerant radiate heat, send, to the receiver, the refrigerant from which the heat has been radiated, decompress the refrigerant, let the refrigerant absorb heat in the heat absorber, and generate heat in the auxiliary heating device, and a maximum cooling mode to shut off the outdoor expansion valve, close the first opening/closing valve, open the second opening/closing valve, send, to the outdoor heat exchanger, the refrigerant discharged from the compressor by the bypass pipe, let the refrigerant radiate heat, send, to the receiver, the refrigerant from which the heat has been radiated, decompress the refrigerant, and then let the refrigerant absorb heat in the heat absorber, and the vehicle air conditioning device is characterized in that when changing from the heating mode to the dehumidifying and heating mode or the maximum cooling mode, the control device changes to a state of sending, to the receiver, the refrigerant flowing out from the outdoor heat exchanger, then controls a number of revolution of the compressor or stops the compressor to reduce a difference between a pressure before the second opening/closing valve and a pressure after the second opening/closing valve, then opens the second opening/closing valve, closes the first opening/closing valve, shuts off the outdoor expansion valve, and shifts the control of the compressor to control in the dehumidifying and heating mode or the maximum cooling mode.

The vehicle air conditioning device of item 2 is characterized in that in item 1, the control device adjusts the number of revolution of the compressor so that the difference between the pressure before the second opening/closing valve and the pressure after the second opening/closing valve becomes not more than a predetermined value, and when the pressure difference becomes not more than the predetermined value, the control device opens the second opening/closing valve, closes the first opening/closing valve, shuts off the outdoor expansion valve, shifts the control of the compressor to the control in the dehumidifying and heating mode or the maximum cooling mode, and lowers a rising speed of the number of revolution of the compressor until the control shifts.

The vehicle air conditioning device of item 3 is characterized in that in item 1, the control device adjusts the number of revolution of the compressor to a previously determined low value, and when the difference between the pressure before the second opening/closing valve and the pressure after the second opening/closing valve becomes not more than the predetermined value, the control device opens the second opening/closing valve, closes the first opening/closing valve, shuts off the outdoor expansion valve, and shifts the control of the compressor to the control in the dehumidifying and heating mode or the maximum cooling mode, or when the outdoor expansion valve shuts off, the control device shifts the control of the compressor to the control in the dehumidifying and heating mode or the maximum cooling mode.

The vehicle air conditioning device of item 4 is characterized in that in item 1, when the control device stops the compressor and the difference between the pressure before the second opening/closing valve and the pressure after the second opening/closing valve becomes not more than a predetermined value or when a predetermined time elapses after the compressor is stopped, the control device opens the second opening/closing valve, closes the first opening/closing valve, shuts off the outdoor expansion valve, and shifts the control of the compressor to the control in the dehumidifying and heating mode or the maximum cooling mode, or when the outdoor expansion valve shuts off, the control device shifts the control of the compressor to the control in the dehumidifying and heating mode or the maximum cooling mode, and lowers a rising speed of the number of revolution of the compressor until the control shifts.

The vehicle air conditioning device of the item 5 is characterized in that in the above items, the control device prohibits increase of the number of revolution of the compressor until a second predetermined time elapses after the difference between the pressure before the second opening/closing valve and the pressure after the second opening/closing valve becomes not more than the predetermined value.

The vehicle air conditioning device of item 6 is characterized in that in item 1, when the control device adjusts the number of revolution of the compressor to a previously determined low value and the difference between the pressure before the second opening/closing valve and the pressure after the second opening/closing valve becomes not more than a predetermined value, or when a predetermined time elapses after the number of revolution of the compressor is adjusted to the low value, the control device opens the second opening/closing valve, closes the first opening/closing valve, shuts off the outdoor expansion valve, and shifts the control of the compressor to the control in the dehumidifying and heating mode or the maximum cooling mode, or when the outdoor expansion valve shuts off, the control device shifts the control of the compressor to the control in the dehumidifying and heating mode or the maximum cooling mode, and lowers a rising speed of the number of revolution of the compressor until the control shifts.

The vehicle air conditioning device of item 7 is characterized in that in the above respective items, when changing from the heating mode to the dehumidifying and heating mode, the control device generates heat in the auxiliary heating device, and when a temperature of the auxiliary heating device becomes not less than a predetermined value, the control device changes to a state of sending, to the receiver, the refrigerant flowing out from the outdoor heat exchanger, and enlarges a valve position of the outdoor expansion valve.

A vehicle air conditioning device item 8 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve interposed between a discharge side of the compressor and an inlet side of the radiator, a bypass pipe branching on an upstream side of this first opening/closing valve, passing the radiator and the outdoor expansion valve, to send, to the outdoor heat exchanger, the refrigerant discharged from the compressor, a second opening/closing valve disposed in this bypass pipe, an auxiliary heating device to heat the air to be supplied from the air flow passage to the vehicle interior, an accumulator connected to a refrigerant suction side of the compressor, a receiver connected to a refrigerant downstream side of the outdoor heat exchanger, and a control device, so that the control device switches between and executes a heating mode to open the first opening/closing valve, close the second opening/closing valve, send, to the radiator, the refrigerant discharged from the compressor, let the refrigerant radiate heat, decompress, in the outdoor expansion valve, the refrigerant from which the heat has been radiated, let the refrigerant absorb heat in the outdoor heat exchanger, send, to the accumulator, the refrigerant by which the heat has been absorbed, and suck the refrigerant from this accumulator into the compressor, a dehumidfying and heating mode to shut off the outdoor expansion valve, close the first opening/closing valve, open the second opening/closing valve, send, to the outdoor heat exchanger, the refrigerant discharged from the compressor by the bypass pipe, let the refrigerant radiate heat, send, to the receiver, the refrigerant from which the heat has been radiated, decompress the refrigerant, let the refrigerant absorb heat in the heat absorber, and generate heat in the auxiliary heating device, and a maximum cooling mode to shut off the outdoor expansion valve, close the first opening/closing valve, open the second opening/closing valve, send, to the outdoor heat exchanger, the refrigerant discharged from the compressor by the bypass pipe, let the refrigerant radiate heat, send, to the receiver, the refrigerant from which the heat has been radiated, decromress the refrigerant, and then let the refrigerant absorb heat in the heat absorber, and the vehicle air conditioning device is characterized in that when changing from the heating mode to the dehumidifying and heating mode or the maxmium cooling mode, the control device changes to a state of sending, to the receiver, the refrigerant flowing out from the outdoor heat exchanger, then controls a number of revolution of the compressor or stops the compressor to reduce a difference between a pressure before the second opening/closing valve and a pressure after the second opening/closing valve, then opens the second opening/closing valve, closes the first opening/closing valve, shuts off the outdoor expansion valve, and shifts the control of the compressor to control in the dehumidifying and heating mode or the maximum cooling mode.

The vehicle air conditioning device of item 9 is characterized in that in the above items, the control device adjusts the number of revolution of the compressor so that the difference between the pressure before the second opening/closing valve and the pressure after the second opening/closing valve becomes not more than a predetermined value, and when the pressure difference becomes not more than the predetermined value, the control device opens the second opening/closing valve, closes the first opening/closing valve, shuts off the outdoor expansion valve, shifts the control of the compressor to the control in the dehumidifying and heating mode or the maximum cooling mode, and lowers a rising speed of the number of revolution of the compressor until the control shifts.

The vehicle air conditioning device of item 10 is characterized in that in item 8, the control device adjusts the number of revolution of the compressor to a previously determined low value, and when the difference between the pressure before the second opening/closing valve and the pressure after the second opening/closing valve becomes not more than the predetermined value, the control device opens the second opening/closing valve, closes the first opening/closing valve, shuts off the outdoor expansion valve, and shifts the control of the compressor to the control in the dehumidifying and heating mode or the maximum cooling mode, or when the outdoor expansion valve shuts off, the control device shifts the control of the compressor to the control in the dehumidifying and heating more or the maximum cooling mode.

The vehicle air conditioning device of item 10 is characterized in that in item 8, when the control device stops the compressor and the difference between the pressure before the second opening/closing valve and the pressure after the second opening/closing valve becomes not more than a predetermined value or when a predetermined time elapses after the compressor is stopped, the control device opens the second opening/closing valve, closes the first opening/closing valve, shuts off the outdoor expansion valve, and shifts the control of the compressor to the control in the dehumidifying and heating mode or the maximum cooling mode, or when the outdoor expansion valve shuts off, the control device shifts the control of the compressor to the control in the dehumidifying and heating mode or the maximum cooling mode, and lowers a rising speed of the number of revolution of the compressor until the control shifts.

The vehicle air conditioning device of item 11 is characterized in that in item 8, the control device prohibits increase of the number of revolution of the compressor until a second predetermined time elapses after the difference between the pressure before the second opening/closing valve and the pressure after the second opening/closing valve becomes not more than the predetermined value.

The vehicle air conditioning device of item 6 is characterized in that in item 1, when the control device adjusts the number of revolution of the compressor to a previously determined low value and the difference between the pressure before the second opening/closing valve and the pressure after the second opening/closing valve becomes not more than a predetermined value, or when a predetermined time elapses after the number of revolution of the compressor is adjusted to the low value, the control device opens the second opening/closing valve, closes the first opening/closing valve, shuts off the outdoor expansion valve, and shifts the control of the compressor to the control in the dehumidifying and heating mode or the maximum cooling mode, or when the outdoor expansion valve shuts off, the control device shifts the control of the compressor to the control in the dehumidifying and heating mode or the maximum cooling mode, and lowers a rising speed of the number of revolution of the compressor until the control shifts.

The vehicle air conditioning device of item 7 is characterized in that in the above respective items, when changing from the heating mode to the dehumidifying and heating mode, the control device generates heat in the auxiliary heating device, and when a temperature of the auxiliary heating device becomes not less than a predetermined value, the control device changes to a state of sending, to the receiver, the refrigerant flowing out from the outdoor heat exchanger, and enlarges a valve position of the outdoor expansion valve.

The vehicle air conditioning device of item 12 includes a compressor to compress a refrigerant, an air flow passage through which air to be supplied to a vehicle interior flows, a radiator to let refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve interposed between a discharge side of the compressor and an inlet side of the radiator, a bypass pipe branching on an upstream side of this first opening/closing valve, passing the radiator and the outdoor expansion valve, to the outdoor heat exchanger, the refrigerant discharged from the compressor, a second opening/closing valve disposed in this bypass pipe, an accumulator connected to a refrigerant suction side of the compressor, a receiver connected to a refrigerant downstream side of the outdoor heat exchanger, and a control device, so that the control device switches between and executes a heating mode to open the first opening/closing valve, close the second opening/closing valve, send, to the radiator, the refrigerant discharged from the compressor, let the refrigerant radiate heat, decompresses, in the outdoor expansion valve, the refrigerant from which the heat has been radiated, let the refrigerant absorb heat in the outdoor heat exchanger, send, to the accumulator, the refrigerant by which the heat has been absorbed, and suck the refrigerant from this accumulator into the compressor, and a cooling mode to open the first opening/closing valve, close the second opening/closing valve, fully open the outdoor expansion valve, to the outdoor heat exchanger, the refrigerant discharged from the compressor from the radiator, let the refrigerant radiate heat in the outdoor heat exchanger, send, to the receiver, the refrigerant from which the heat has been radiated, decompress the refrigerant, and then let the refrigerant absorb heat in the heat absorber, and the vehicle air conditioning device is characterized in that when changing from the heating mode to the cooling mode, the control device changes to a state of sending, to the receiver, the refrigerant flowing out from the outdoor heat exhcanger, fully opens the outdoor expansion valve, then controls a number of revolution of the compressor or stops the compressor to reduce a difference between a pressure before the second opening/closing valve and a pressure after the second opening/closing valve, and then shifts the control of the compressor to control in the cooling mode.

The vehicle air conditioning device of item 13 is characterized in that in the above item, the control device adjusts the number of revolution of the compressor to a previously determined low value to reduce the difference between the pressure before the second opening/closing valve and the pressure after the second opening/closing valve, and when the pressure difference becomes not more than a predetermined value or when a predetermined time elapses after the number of revolution of the compressor is adjusted to the low value, the control device shifts the control of the compressor to the control in the cooling mode.

The vehicle air conditioning device of item 14 is characterized in that in item 12, the control device stops the compressor to reduce the difference between the pressure before the second opening/closing valve and the pressure after the second opening/closing valve, and when the pressure difference becomes not more than a predetermined value or when a predetermined time elapses after the compressor is stopped, the control device shifts the control of the compressor to the control in the cooling mode, and lowers a rising speed of the number of revolution of the compressor until the control shifts.

The vehicle air conditioning device of item 15 is characterized in that in item 12, the control device adjusts the number of revolution of the compressor so that the difference between the pressure before the second opening/closing valve and the pressure after the second opening/closing valve becomes not more than a predetermined value, and when the pressure difference becomes not more than the predetermined time elapses after the adjustment of the number of revolution of the compressor is started, the control device shifts the control of the compressor to the control in the cooling mode, and lowers a rising speed of the number of revolution of the compressor until the control shifts. compressor and an inlet side of the radiator, a bypass pipe branching on an upstream side of this first opening/closing valve, passing the radiator and the outdoor expansion valve, to send, to the outdoor heat exchanger, the refrigerant discharged from the compressor, a second opening/closing valve disposed in this bypass pipe, an accumulator connected to a refrigerant suction side of the compressor, a receiver connected to a refrigerant downstream side of the outdoor heat exchanger, and a control device, so that the control device switches between and executes a heating mode to open the first opening/closing valve, close the second opening/closing valve, send, to the radiator, the refrigerant discharged from the compressor, let the refrigerant radiate heat, decompress, in the outdoor expansion valve, the refrigerant from which the heat has been radiated, let the refrigerant absorb heat in the outdoor heat exchanger, send, to the accumulator, the refrigerant by which the heat has been absorbed, and suck the refrigerant from this accumulator into the compressor, and a dehumidifying and cooling mode to open the first opening/closing valve, close the second opening/closing valve, send, to the outdoor heat exchanger, the refrigerant discharged from the compressor from the radiator, let the refrigerant radiate heat in the radiator and the outdoor heat exchanger, send, to the receiver, the refrigerant from which the heat has been radiated, decompress the refrigerant, and then let the refrigerant absorb heat in the heat absorber, and the vehicle air conditioning device is characterized in that when changing from the heating mode to the dehumidifying and cooling mode, the control device changes to a state of sending, to the receiver, the refrigerant flowing pressure after the second opening/closing valve. Consequently, in case of mode switching which the refrigerant moves from the accumulator to the receiver, it is possible to inhibit a large amount of refrigerant from being sucked from the accumulator into the compressor and inhibit the pressure in the accumulator from being rapidly dropped.

In consequence, when changing from the heating mode to the dehumidifying and heating mode, the maximum cooling mode, the cooling mode or the dehumidifying and cooling mode, it is possible to prevent or inhibit occurrence of bumping of the refrigerant in the accumulator, and it is possible to effectively eliminate or inhibit liquid compression in the compressor or generation of noise in the accumulator. Therefore, it is possible to improve reliability of a vehicle air conditioning device and it is also possible to effectively improve comfort of a passenger.

In particular, as in items 2, 4, 6, 10, 11, 14 or 15, when the control device lowers a rising speed of the number of revolution of the compressor until the control of the compressor shifts to control in the shifted mode, it is possible to further inhibit the decrease of the pressure in the accumulator at the change of the mode, and it is possible to effectively prevent or inhibit the occurrence of the bumping in the accumulator.

Furthermore, as in items 2, 4, 6, 9 to 11 and 13 to 15, when the difference between the pressure before the second opening/closing valve and the pressure after the second opening/closing valve becomes not more than a predetermined value, the control device shifts the control of the compressor to the control in the shifted mode. In this case, it is possible to accurately prevent or inhibit the occurrence of the bumping in the accumulator.

It is to be noted that as in items 4, 6, 9 to 11 and 13 to 15, after elapse of a predetermined time, the control device shifts the control of the compressor to the control in the shifted mode. Also in this case, it is possible to effectively prevent or inhibit the occurrence of the bumping in the accumulator. Furthermore, it is also effective that as in item 5, the control device prohibits increase of the number of revolution of the compressor until a second predetermined time elapses after the difference between the pressure before the second opening/closing valve and the pressure after the second opening/closing valve becomes not more than the predetermined value.

Furthermore, as in an aspect of item 7, when changing from the heating mode to the dehumidifying and heating mode, the control device generates heat in an auxiliary heating device. Consequently, it is possible to eliminate drop of an outlet temperature which is caused by the control of the number of revolution of the compressor when switching between the modes, and it is possible to continue comfortable air conditioning of a vehicle interior.

MODE FOR CARRYING OUT THE INVENTION

Hereinafter, description will be made as to embodiments of the present invention in detail with reference to the drawings.

Figure 1:
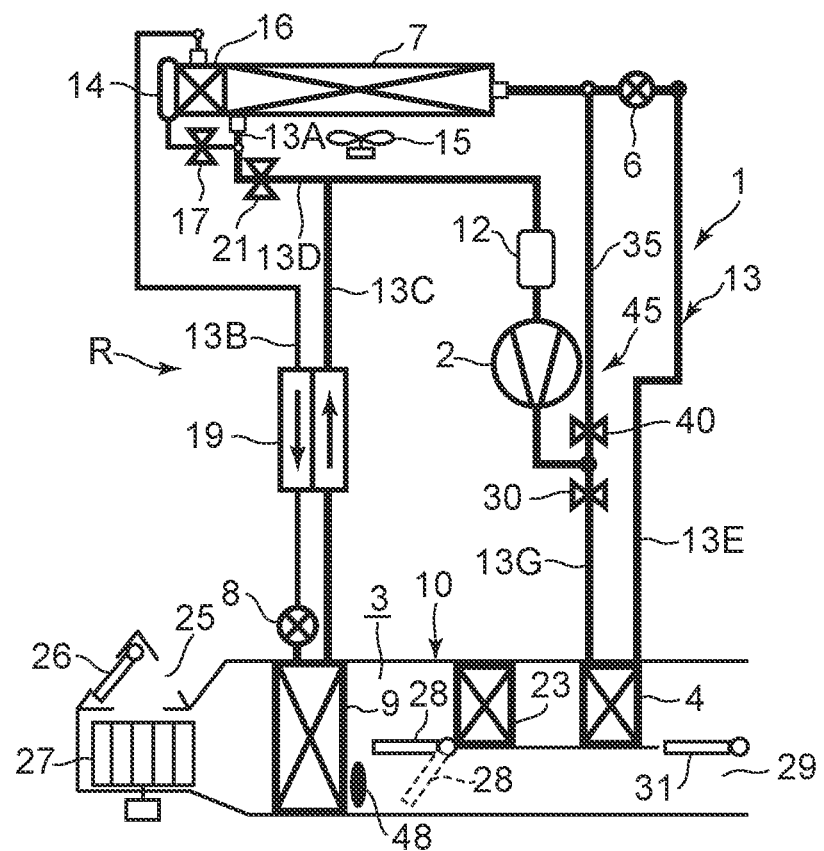
FIG. 1 is a constitutional view of a vehicle air conditioning device of one embodiment to which the present invention is applied (a heating mode, a dehumidifying and heating mode, a dehumidifying and cooling mode and a cooling mode)

FIG. 1 shows a constitutional view of a vehicle air conditioning device 1 of one embodiment of the present invention. A vehicle of the embodiment to which the present invention is applied is an electric vehicle (EV) in which an engine (an internal combustion engine) is not mounted, and runs with an electric motor for running which is driven by power charged in a battery (which is not shown in the drawing), and the vehicle air conditioning device 1 of the present invention is also driven by the power of the battery. Specifically, in the electric vehicle which is not capable of performing heating by engine waste heat, the vehicle air conditioning device 1 of the embodiment performs a heating mode by a heat pump operation in which a refrigerant circuit is used, and furthermore, the conditioning device selectively executes respective operation modes of a dehumidifying and heating mode, a dehumidifying and cooling mode, a cooling mode, and a MAX cooling mode (the maximum cooling mode).

It is to be noted that the vehicle is not limited to the electric vehicle, and the present invention is also effective for a so-called hybrid car in which the engine is used together with the electric motor for running. Furthermore, needless to say, the present invention is also applicable to a usual car which runs with the engine.

The vehicle air conditioning device 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant, a radiator 4 disposed in an air flow passage 3 of an HVAC unit 10 in which vehicle interior air passes and circulates, to send inside the high-temperature high-pressure refrigerant discharged from the compressor 2 via a refrigerant pipe 13G and let this refrigerant radiate heat in the vehicle interior, an outdoor expansion valve 6 constituted of an electric valve which decompresses and expands the refrigerant during the heating, an outdoor heat exchanger 7 which is disposed outside the vehicle interior and performs heat exchange between the refrigerant and outdoor air to function as the radiator during the cooling and to function as an evaporator during the heating, an indoor expansion valve 8 constituted of an electric valve to decompress and expand the refrigerant, a heat absorber 9 disposed in the air flow passage 3 to let the refrigerant absorb or radiate heat from interior and exterior of the vehicle during the cooling and during the dehumidifying, an accumulator 12, and others, thereby constituting a refrigerant circuit R.

Furthermore, this refrigerant circuit R is charged with a predetermined amount of refrigerant and a predetermined amount of lubricating oil. It is to be noted that an outdoor blower 15 is provided in the outdoor heat exchanger 7. The outdoor blower 15 forcibly sends the outdoor air through the outdoor heat exchanger 7 to perform the heat exchange between the outdoor air and the refrigerant, whereby the outdoor air passes through the outdoor heat exchanger 7 also during stopping of the vehicle (i.e., a velocity is 0 km/h).

Additionally, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve 17 to be opened during the cooling, and a refrigerant pipe 13B on an outlet side of the subcooling portion 16 is connected to an inlet side of the heat absorber 9 via the indoor expansion valve 8. It is to be noted that the receiver drier portion 14 and the subcooling portion 16 structurally constitute a part of the outdoor heat exchanger 7.

In addition, the refrigerant pipe 13B between the subcooling portion 16 and the indoor expansion valve 8 is disposed in a heat exchange relation with a refrigerant pipe 13C on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9.

Furthermore, the refrigerant pipe 13A extending out from the outdoor heat exchanger 7 branches to a refrigerant pipe 13D, and this branching refrigerant pipe 13D communicates and connects with the refrigerant pipe 13C on a downstream side of the internal heat exchanger 19 via a solenoid valve 21 to be opened during the heating. The refrigerant pipe 13C is connected to the accumulator 12, and the accumulator 12 is connected to a refrigerant suction side of the compressor 2. Additionally, a refrigerant pipe 13E on an outlet side of the radiator 4 is connected to an inlet side of the outdoor heat exchanger 7 via the outdoor expansion valve 6.

In addition, a solenoid valve 30 (constituting a flow channel changing device) to be closed during the dehumidifying and heating and MAX cooling described later is disposed in the refrigerant pipe 13G between a discharge side of the compressor 2 and an inlet side of the radiator 4. In this case, the refrigerant pipe 13G branches to a bypass pipe 35 on an upstream side of the solenoid valve 30, and this bypass pipe 35 communicates and connects with the refrigerant pipe 13E on a downstream side of the outdoor expansion valve 6 via a solenoid valve 40 (this also constitutes the flow channel changing device) which is to be opened during the dehumidifying and heating and MAX cooling. The bypass pipe 35, the solenoid valve 30 and the solenoid valve 40 constitute a bypass device 45 in the present invention.

Thus, the bypass pipe 35, the solenoid valve 30 and the solenoid valve 40 constitute the bypass device 45, so that it is possible to smoothly change from the dehumidifying and heating mode or the MAX cooling mode to send, directly into the outdoor heat exchanger 7, the refrigerant discharged from the compressor 2 as described later, to the heating mode, the dehumidifying and cooling mode or the cooling mode to send, into the radiator 4, the refrigerant discharged from the compressor 2.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor or outdoor air to the air flow passage 3.

Additionally, in FIG. 1, reference numeral 23 denotes an auxiliary heater as an auxiliary heating device disposed in the vehicle air conditioning device 1 of the embodiment. The auxiliary heater 23 of the embodiment is constituted of a PTC heater which is an electric heater, and disposed in the air flow passage 3 on an air upstream side of the radiator 4 to the flow of the air in the air flow passage 3. Then, when the auxiliary heater 23 is energized to generate heat, the air in the air flow passage 3 which flows into the radiator 4 through the heat absorber 9 is heated. That is, the auxiliary heater 23 becomes a so-called heater core to perform or complement the heating of the vehicle interior.

Furthermore, in the air flow passage 3 on an air upstream side of the auxiliary heater 23, an air mix damper 28 is disposed to adjust a degree at which the air (the indoor or outdoor air) in the air flow passage 3, flowing into the air flow passage 3 and passed through the heat absorber 9, passes through the auxiliary heater 23 and the radiator 4. Further in the air flow passage 3 on an air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
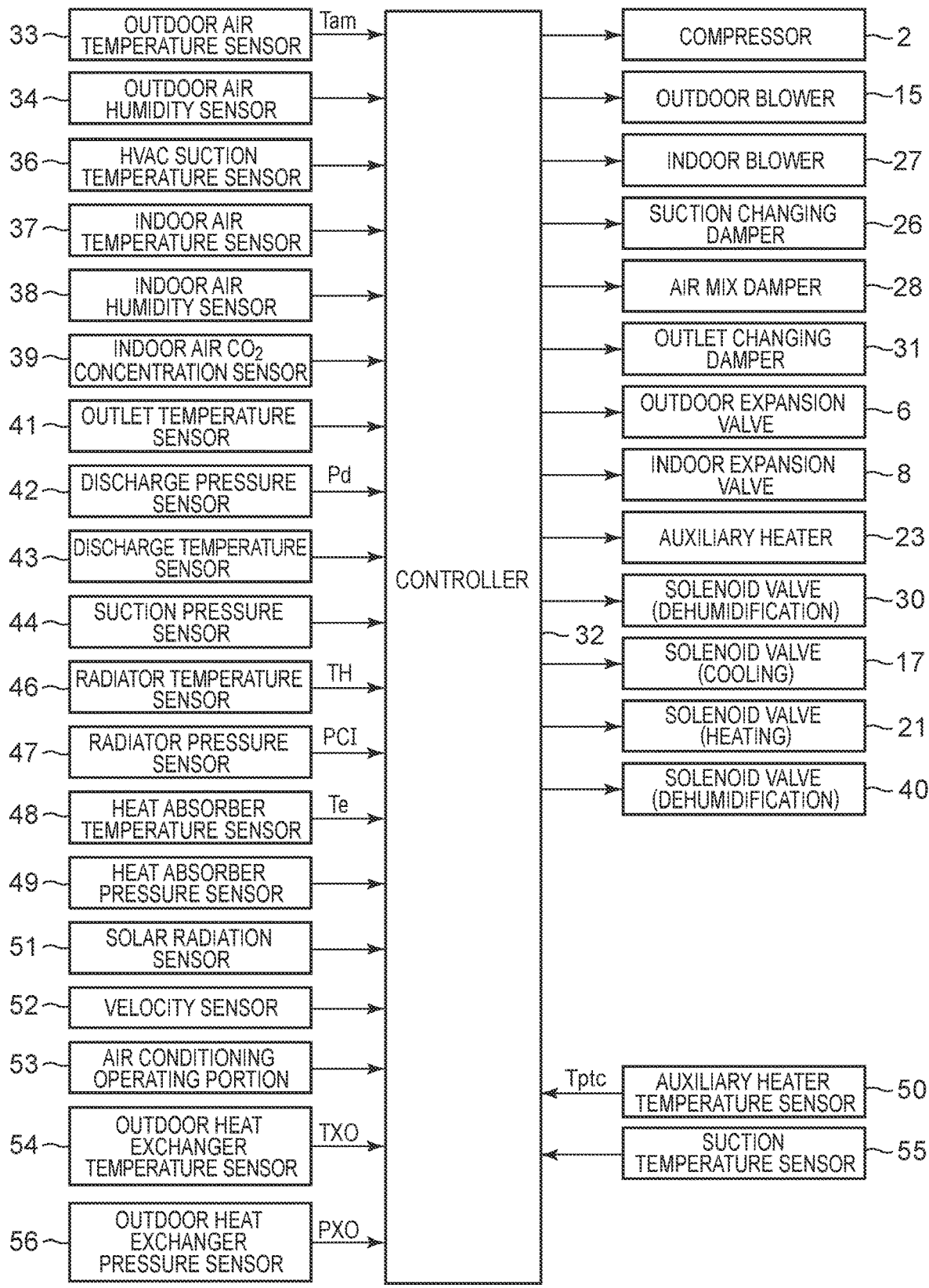
FIG. 2 is a block diagram of an electric circuit of a controller of the vehicle air conditioning device of FIG. 1.

Next, in FIG. 2, reference numeral 32 denotes a controller (ECU) as a control device constituted of a microcomputer which is an example of a computer including a processor, and an input of the controller 32 is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction pressure sensor 44 which detects a pressure of the refrigerant to be sucked into the compressor 2, a suction temperature sensor 55 which detects a temperature of the refrigerant to be sucked into the compressor 2, a radiator temperature sensor 46 which detects a temperature of the radiator 4 (the temperature of the air passed through the radiator 4 or the temperature of the radiator 4 itself: a radiator temperature TH), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the switching between operation modes, an outdoor heat exchanger temperature sensor 54 which detects a temperature of the outdoor heat exchanger 7 (the temperature immediately after the refrigerant flows out from the outdoor heat exchanger 7, or the temperature of the outdoor heat exchanger 7 itself: an outdoor heat exchanger temperature TXO), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7: an outdoor heat exchanger pressure PXO). Furthermore, the input of the controller 32 is further connected to an output of an auxiliary heater temperature sensor 50 which detects a temperature of the auxiliary heater 23 (the temperature immediately after the air is heated by the auxiliary heater 23 or the temperature of the auxiliary heater 23: an auxiliary heater temperature Tptc).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the auxiliary heater 23, and the respective solenoid valves, i.e., the solenoid valve 30 (for the dehumidifying), the solenoid valve 17 (for the cooling), the solenoid valve 21 (for the heating) and the solenoid valve 40 (also for the dehumidifying). Then, the controller 32 controls these components on the basis of the outputs of the respective sensors and the setting input by the air conditioning operating portion 53.

Next, description will be made as to an operation of the vehicle air conditioning device 1 of the embodiment having the above constitution. In the embodiment, the controller 32 switches between and executes the respective operation modes of the heating mode, the dehumidifying and heating mode, the dehumidifying and cooling mode, the cooling mode and the MAX cooling mode (the maximum cooling mode). Description will initially be made as to a flow of the refrigerant and an outline of control in each operation mode.

(1) Heating Mode

When the heating mode is selected by the controller 32 (an automatic mode) or a manual operation to the air conditioning operating portion 53 (a manual mode), the controller 32 opens the solenoid valve 21 (for the heating) and closes the solenoid valve 17 (for the cooling). Furthermore, the controller opens the solenoid valve 30 (for the dehumidifying) and closes the solenoid valve 40 (for the dehumidifying).

Then, the controller operates the compressor 2 and the respective blowers 15 and 27, and the air mix damper 28 has a state of sending, to the auxiliary heater 23 and the radiator 4, all the air in the air flow passage 3 that is blown out from the indoor blower 27 and passed through the heat absorber 9 as shown by a broken line in FIG. 1. In consequence, a high-temperature high-pressure gas refrigerant discharged from the compressor 2 flows into the radiator 4 through the solenoid valve 30 and the refrigerant pipe 13G. The air in the air flow passage 3 passes through the radiator 4, and hence the air in the air flow passage 3 heats by the high-temperature refrigerant in the radiator 4 (in the auxiliary heater 23 and the radiator 4, when the auxiliary heater 23 operates), whereas the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21 and the refrigerant pipe 13D, and flows from the refrigerant pipe 13C into the accumulator 12 to perform gas-liquid separation, and the gas refrigerant is sucked into the compressor 2, thereby repeating this circulation. The air heated in the radiator 4 (in the auxiliary heater 23 and the radiator 4, when the auxiliary heater 23 operates) is blown out from the outlet 29, thereby performing the heating of the vehicle interior.

The controller 32 calculates a target radiator pressure PCO (a target value of the radiator pressure PCI) from a target radiator temperature TCO (a target value of the radiator temperature TH) calculated from an after-mentioned target outlet temperature TAO, and controls a number of revolution of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Furthermore, the controller 32 controls a valve position of the outdoor expansion valve 6 on the basis of the temperature (the radiator temperature TH) of the radiator 4 which is detected by the radiator temperature sensor 46 and the radiator pressure PCI detected by the radiator pressure sensor 47, and controls a subcool degree SC of the refrigerant in an outlet of the radiator 4. The target radiator temperature TCO is basically TCO=TAO, but a predetermined limit of controlling is provided.

Furthermore, in this heating mode, when a heating capability by the radiator 4 runs short to a heating capability required for vehicle interior air conditioning, the controller 32 controls the energization of the auxiliary heater 23 to complement the shortage by the heat generation of the auxiliary heater 23. In consequence, comfortable vehicle interior heating is achieved, and frosting of the outdoor heat exchanger 7 is inhibited. At this time, the auxiliary heater 23 is disposed on the air upstream side of the radiator 4, and hence the air flowing through the air flow passage 3 is passed through the auxiliary heater 23 before the radiator 4.

Here, if the auxiliary heater 23 is disposed on the air downstream side of the radiator 4 and when the auxiliary heater 23 is constituted of the PTC heater as in the embodiment, the temperature of the air flowing into the auxiliary heater 23 rises due to the radiator 4. Therefore, a resistance value of the PTC heater increases, and a current value decreases to also decrease an amount of heat to be generated, but the auxiliary heater 23 is disposed on the air upstream side of the radiator 4, so that it is possible to sufficiently exert a capability of the auxiliary heater 23 constituted of the PTC heater as in the embodiment.

(2) Dehumidifying and Heating Mode

Next, in the dehumidifying and heating mode, the controller 32 opens the solenoid valve 17 and closes the solenoid valve 21. Furthermore, the controller closes the solenoid valve 30, opens the solenoid valve 40, and adjusts a valve position of the outdoor expansion valve 6 to a shutoff position. Then, the controller operates the compressor 2 and the respective blowers 15 and 27. As shown by the broken line in FIG. 1, the air mix damper 28 achieves a state of sending, to the auxiliary heater 23 and the radiator 4, all the air in the air flow passage 3 that is blown out from the indoor blower 27 and passed through the heat absorber 9.

In consequence, the high-temperature high-pressure gas refrigerant discharged from the compressor 2 to the refrigerant pipe 13G flows into the bypass pipe 35 without flowing toward the radiator 4, and flows through the solenoid valve 40 to reach the refrigerant pipe 13E on the downstream side of the outdoor expansion valve 6. At this time, the outdoor expansion valve 6 is shut off, and hence the refrigerant flows into the outdoor heat exchanger 7. The refrigerant flowing into the outdoor heat exchanger 7 is cooled by running therein or the outdoor air passed through the outdoor blower 15, to condense. The refrigerant flowing out from the outdoor heat exchanger 7 flows from the refrigerant pipe 13A through the solenoid valve 17 successively into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. In the indoor expansion valve 8, the refrigerant is decompressed, and then flows into the heat absorber 9 to evaporate. By a heat absorbing operation at this time, the air blown out from the indoor blower 27 is cooled, and water in the air coagulates to adhere to the heat absorber 9. Therefore, the air in the air flow passage 3 is cooled and dehumidified. The refrigerant evaporated in the heat absorber 9 flows through the internal heat exchanger 19 and the refrigerant pipe 13C to reach the accumulator 12, and flows therethrough to be sucked into the compressor 2, thereby repeating the circulation.

At this time, the valve position of the outdoor expansion valve 6 is adjusted to the shutoff position, so that it is possible to inhibit or prevent the disadvantage that the refrigerant discharged from the compressor 2 flows from the outdoor expansion valve 6 back into the radiator 4. Consequently, it is possible to inhibit or eliminate decrease of an amount of the refrigerant to be circulated, thereby acquiring the air conditioning capability. Furthermore, in this dehumidifying and heating mode, the controller 32 energizes the auxiliary heater 23 to generate heat. Consequently, the air cooled and dehumidified in the heat absorber 9 is further heated in a process of passing the auxiliary heater 23, and hence a temperature rises, thereby performing the dehumidifying and heating of the vehicle interior.

The controller 32 controls the number of revolution of the compressor 2 on the basis of the temperature (the heat absorber temperature Te) of the heat absorber 9 which is detected by the heat absorber temperature sensor 48 and a target heat absorber temperature TEO that is a target value of the heat absorber temperature, and the controller controls the energization (the heat generation) of the auxiliary heater 23 on the basis of the auxiliary heater temperature Tptc detected by the auxiliary heater temperature sensor 50 and the above-mentioned target radiator temperature TCO. Consequently, the drop of the temperature of the air blown out from the outlet 29 to the vehicle interior is accurately prevented by the heating of the auxiliary heater 23, while appropriately performing the cooling and dehumidifying of the air in the heat absorber 9.

In consequence, the temperature of the air blown out to the vehicle interior can be controlled at an appropriate heating temperature while dehumidifying the air, and it is possible to achieve comfortable and efficient dehumidifying and heating of the vehicle interior. Furthermore, as described above, in the dehumidifying and heating mode, the air mix damper 28 has a state of sending, through the auxiliary heater 23 and the radiator 4, all the air in the air flow passage 3. Therefore, the air passed through the heat absorber 9 is efficiently heated by the auxiliary heater 23, thereby improving energy saving properties, and controllability of the air conditioning for the dehumidifying and heating can improve.

It is to be noted that the auxiliary heater 23 is disposed on the air upstream side of the radiator 4, and hence the air heated by the auxiliary heater 23 passes through the radiator 4. However, in this dehumidifying and heating mode, the refrigerant does not flow through the radiator 4, and hence it is possible to eliminate the disadvantage that heat is absorbed, by the radiator 4, from the air heated by the auxiliary heater 23. Specifically, it is possible to inhibit the temperature drop of the air blown out to the vehicle interior by the radiator 4, and a coefficient of performance (COP) improves.

(3) Dehumidifying and Cooling Mode

Next, in the dehumidifying and cooling mode, the controller 32 opens the solenoid valve 17 and closes the solenoid valve 21. The controller also opens the solenoid valve 30 and closes the solenoid valve 40. Then, the controller operates the compressor 2 and the respective blowers 15 and 27, and the air mix damper 28 has the state of sending, through the auxiliary heater 23 and the radiator 4, all the air in the air flow passage 3 that is blown out from the indoor blower 27 and passed through the heat absorber 9. Consequently, the high-temperature high-pressure gas refrigerant discharged from the compressor 2 flows through the solenoid valve 30 and flows from the refrigerant pipe 13G into the radiator 4. The air in the air flow passage 3 passes through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. In this dehumidifying and cooling mode, the controller 32 does not energize the auxiliary heater 23, and hence the air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolution of the compressor 2 on the basis of the temperature of the heat absorber 9 (the heat absorber temperature Te) which is detected by the heat absorber temperature sensor 48, also controls the valve position of the outdoor expansion valve 6 on the basis of the above-mentioned high pressure of the refrigerant circuit R, and controls the refrigerant pressure of the radiator 4 (the radiator pressure PCI).

(4) Cooling Mode

Next, in the cooling mode, the controller 32 adjusts the valve position of the outdoor expansion valve 6 to a fully opened position in the above state of the dehumidifying and cooling mode. It is to be noted that the controller 32 controls the air mix damper 28 to adjust a ratio at which the air in the air flow passage 3, blown out from the indoor blower 27 and passed through the heat absorber 9, passes through the auxiliary heater 23 and the radiator 4 as shown by a solid line in FIG. 1. Furthermore, the controller 32 does not energize the auxiliary heater 23.

In consequence, the high-temperature high-pressure gas refrigerant discharged from the compressor 2 flows through the solenoid valve 30 and flows from the refrigerant pipe 13G into the radiator 4, and the refrigerant flowing out from the radiator 4 flows through the refrigerant pipe 13E to reach the outdoor expansion valve 6. At this time, the outdoor expansion valve 6 is fully opened, and hence the refrigerant passes the outdoor expansion valve to flow into the outdoor heat exchanger 7 as it is, in which the refrigerant is cooled by the running therein or the outdoor air passed through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. The refrigerant is decompressed in the indoor expansion valve 8 and then flows into the heat absorber 9 to evaporate. By the heat absorbing operation at this time, the air blown out from the indoor blower 27 is cooled. Furthermore, the water in the air coagulates to adhere to the heat absorber 9.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. The air cooled and dehumidified in the heat absorber 9 is blown out from the outlet 29 to the vehicle interior (a part of the air passes the radiator 4 to perform heat exchange), thereby performing the cooling of the vehicle interior. In this cooling mode, the controller 32 also controls the number of revolution of the compressor 2 on the basis of the temperature of the heat absorber 9 (the heat absorber temperature Te) which is detected by the heat absorber temperature sensor 48 and the target heat absorber temperature TEO that is the target value of the heat absorber temperature.

(5) MAX Cooling Mode (Maximum Cooling Mode)

Figure 3:
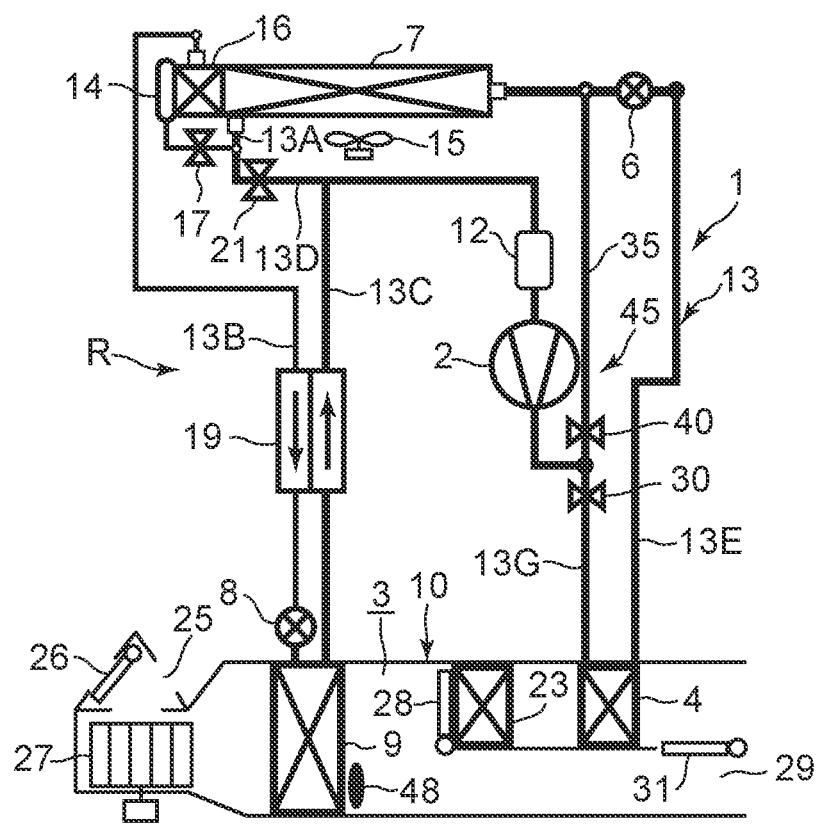
FIG. 3 is a constitutional view at the time of a MAX cooling mode (the maximum cooling mode) of the vehicle air conditioning device of FIG. 1.

Next, in the MAX cooling mode that is the maximum cooling mode, the controller 32 opens the solenoid valve 17 and closes the solenoid valve 21. The controller also closes the solenoid valve 30, opens the solenoid valve 40, and adjusts the valve position of the outdoor expansion valve 6 to the shutoff position. Then, the controller operates the compressor 2 and the respective blowers 15 and 27, and the air mix damper 28 has a state where the air in the air flow passage 3 does not pass through the auxiliary heater 23 and the radiator 4 as shown in FIG. 3. However, even when the air slightly passes, there are not any problems. Furthermore, the controller 32 does not energize the auxiliary heater 23.

In consequence, the high-temperature high-pressure gas refrigerant discharged from the compressor 2 to the refrigerant pipe 13G flows into the bypass pipe 35 without flowing toward the radiator 4, and flows through the solenoid valve 40 to reach the refrigerant pipe 13E on the downstream side of the outdoor expansion valve 6. At this time, the outdoor expansion valve 6 is shut off, and hence the refrigerant flows into the outdoor heat exchanger 7. The refrigerant flowing into the outdoor heat exchanger 7 is cooled by running therein or the outdoor air passed through the outdoor blower 15, to condense. The refrigerant flowing out from the outdoor heat exchanger 7 flows from the refrigerant pipe 13A through the solenoid valve 17 successively into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. In the indoor expansion valve 8, the refrigerant is decompressed and then flows into the heat absorber 9 to evaporate. By the heat absorbing operation at this time, the air blown out from the indoor blower 27 is cooled. Furthermore, the water in the air coagulates to adhere to the heat absorber 9, and hence the air in the air flow passage 3 is dehumidified. The refrigerant evaporated in the heat absorber 9 flows through the internal heat exchanger 19 and the refrigerant pipe 13C to reach the accumulator 12, and flows therethrough to be sucked into the compressor 2, thereby repeating the circulation. At this time, the outdoor expansion valve 6 is shut off, so that it is similarly possible to inhibit or prevent the disadvantage that the refrigerant discharged from the compressor 2 flows from the outdoor expansion valve 6 back into the radiator 4. Consequently, it is possible to inhibit or eliminate the decrease of the amount of the refrigerant to be circulated, and it is possible to acquire an air conditioning capability.

Here, in the above-mentioned cooling mode, the high-temperature refrigerant flows through the radiator 4, and hence direct heat conduction from the radiator 4 to the HVAC unit 10 considerably occurs, but the refrigerant does not flow through the radiator 4 in this MAX cooling mode. Therefore, the air from the heat absorber 9 in the air flow passage 3 is not heated by heat transmitted from the radiator 4 to the HVAC unit 10. Consequently, powerful cooling of the vehicle interior is performed, and especially under an environment where the outdoor air temperature Tam is high, the vehicle interior can rapidly be cooled to achieve the comfortable air conditioning of the vehicle interior. Also in this MAX cooling mode, the controller 32 controls the number of revolution of the compressor 2 on the basis of the temperature of the heat absorber 9 (the heat absorber temperature Te) which is detected by the heat absorber temperature sensor 48 and the target heat absorber temperature TEO that is the target value of the heat absorber temperature.

(6) Switching Between Operation Modes

The air circulated in the air flow passage 3 is subjected to the cooling from the heat absorber 9 and a heating operation from the radiator 4 (and the auxiliary heater 23) (adjusted by the air mix damper 28) in the above respective operation modes, and the air is blown out from the outlet 29 into the vehicle interior. The controller 32 calculates the target outlet temperature TAO on the basis of the outdoor air temperature Tam detected by the outdoor air temperature sensor 33, the temperature of the vehicle interior which is detected by the indoor air temperature sensor 37, the blower voltage, the solar radiation amount detected by the solar radiation sensor 51 and others, and the target vehicle interior temperature (the predetermined temperature) set in the air conditioning operating portion 53. When switching between the operation modes, the controller controls the temperature of the air blown out from the outlet 29 at this target outlet temperature TAO.

In this case, the controller 32 switches between the operation modes on the basis of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, and presence/absence of requirement for the dehumidifying of the vehicle interior, to accurately switch between the heating mode, the dehumidifying and heating mode, the dehumidifying and cooling mode, the cooling mode and the MAX cooling mode in accordance with environment conditions or necessity for the dehumidifying, thereby achieving comfortable and efficient air conditioning of the vehicle interior.

Figure 4:
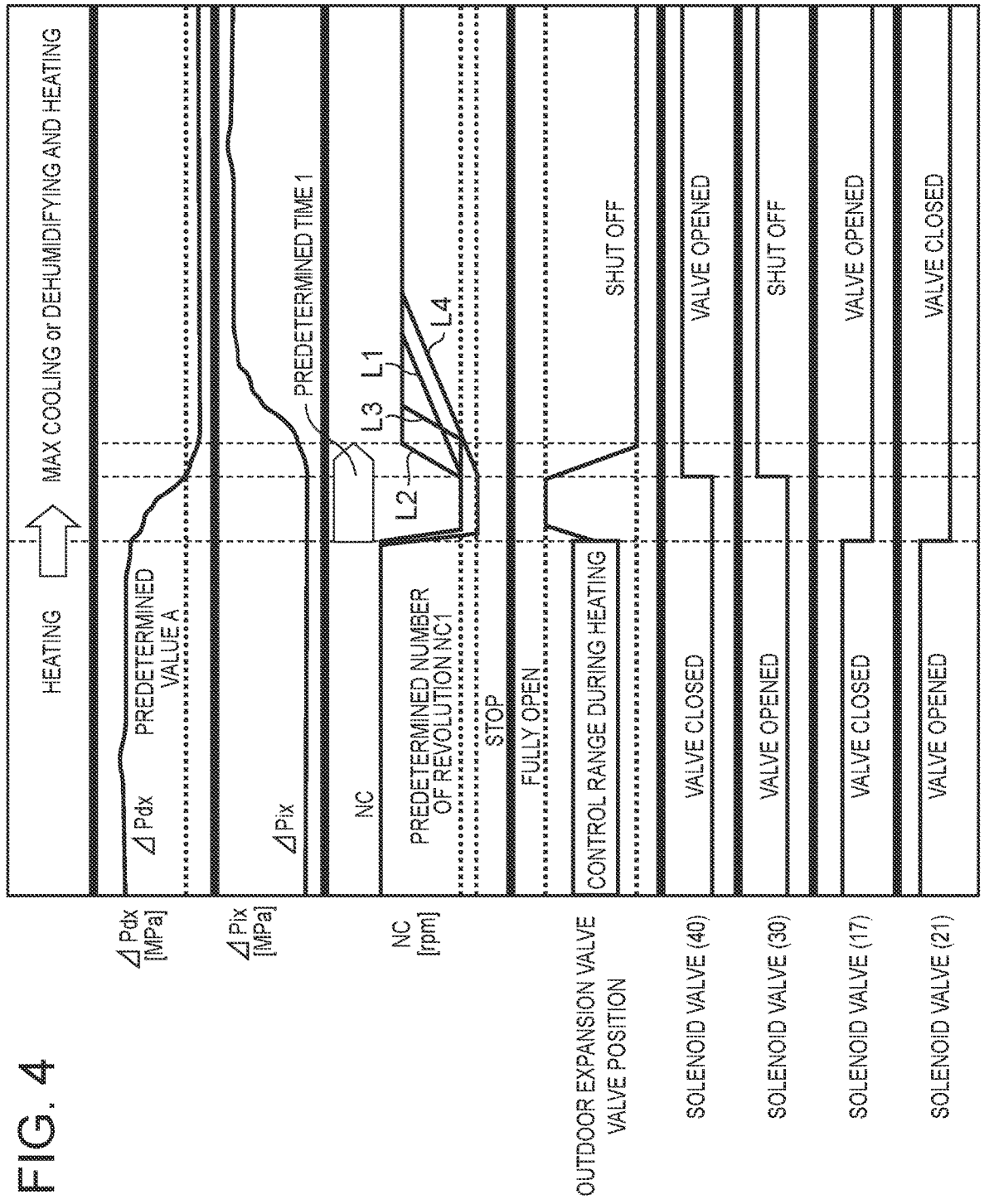
FIG. 4 is a timing chart of each device which is to explain an example of bumping countermeasure control to be executed by the controller of FIG. 2 when changing from the heating mode to the dehumidifying and heating mode or the MAX cooling mode.
Figure 5:
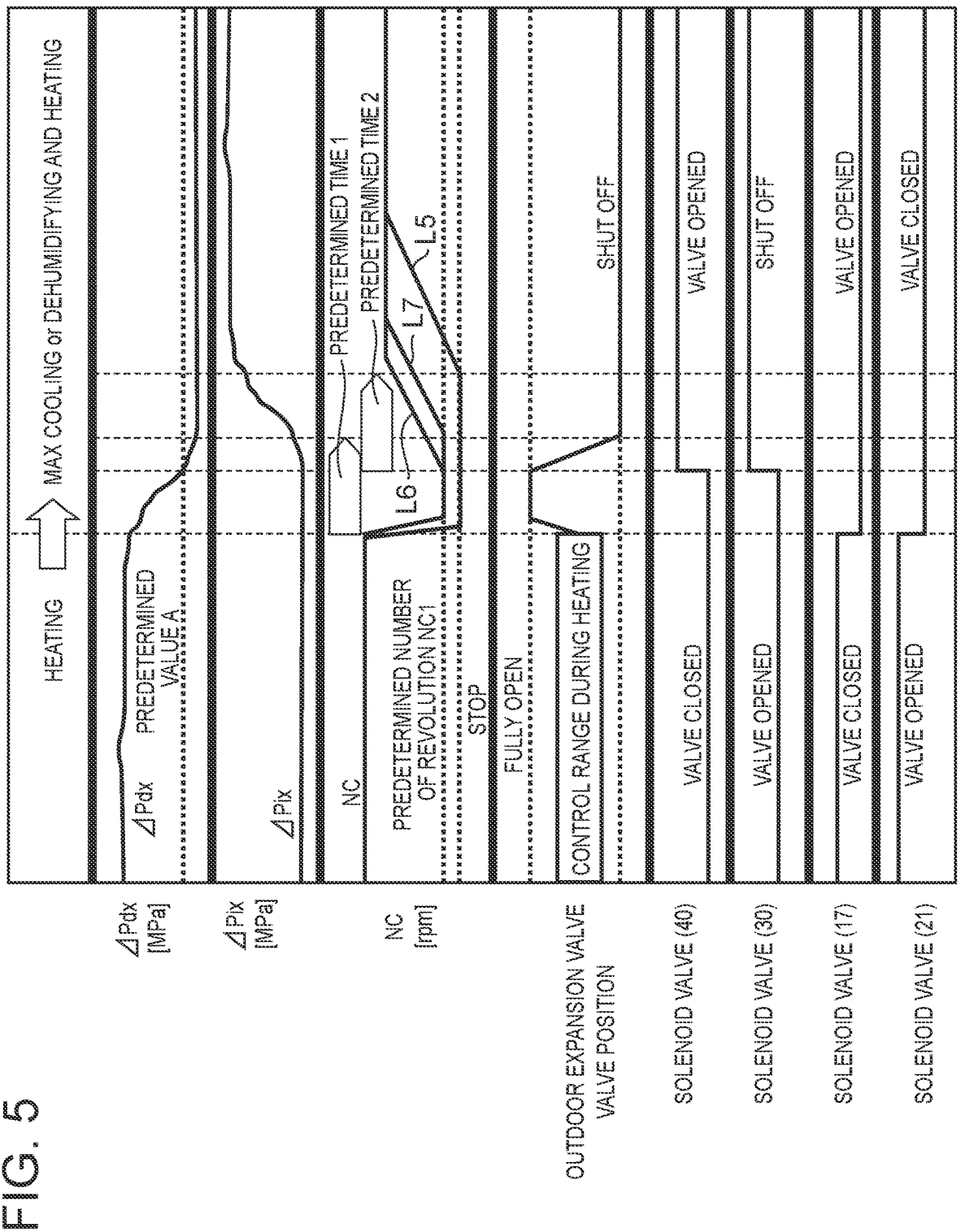
FIG. 5 is a timing chart of each device which is to explain another example of the bumping countermeasure control to be executed by the controller of FIG. 2 when changing from the heating mode to the dehumidifying and heating mode or the MAX cooling mode.

(7) Bumping Countermeasure Control at Change from Heating Mode to Dehumidifying and Heating Mode or MAX Cooling Mode Next, description will be made as to examples of bumping countermeasure control to be executed by the controller 32 when changing the operation mode of the vehicle air conditioning device 1 from the above-mentioned heating mode to the dehumidifying and heating mode or the MAX cooling mode, with reference to FIG. 4 and FIG. 5. Timing charts of FIG. 4 and FIG. 5 show a difference $\Delta Pdx$ between a pressure before the solenoid valve 40 (a second opening/closing valve of the present invention) and a pressure after the solenoid valve, a difference $\Delta Pix$ between a pressure before the solenoid valve 30 (a first opening/closing valve of the present invention) and a pressure after the solenoid valve, a number of revolution NC of the compressor 2, the valve position of the outdoor expansion valve 6, and states of the solenoid valve 40, the solenoid valve 30, the solenoid valve 17 (a fourth opening/closing valve) and the solenoid valve 21 (a third opening/closing valve), when changing from the heating mode to the dehumidifying and heating mode or the MAX cooling mode.

It is to be noted that the difference $\Delta Pdx$ between the pressure before the solenoid valve 40 (the second opening/closing valve) and the pressure after the solenoid valve is a difference ($\Delta Pdx = Pd - PXO$) between the pressure Pd on a refrigerant upstream side of (before) the solenoid valve 40 which is detected by the discharge pressure sensor 42 and the outdoor heat exchanger pressure PXO on a refrigerant downstream side of (after) the solenoid valve 40 which is converted from the temperature of the refrigerant (the outdoor heat exchanger temperature TXO) immediately after the refrigerant flows out from the outdoor heat exchanger 7, which is detected by the outdoor heat exchanger temperature sensor 54 (when the outdoor heat exchanger pressure sensor 56 is disposed as in the embodiment, the outdoor heat exchanger pressure PXO detected by the outdoor heat exchanger pressure sensor 56 may be used). The difference is calculated by the controller 32.

Furthermore, the difference $\Delta Pix$ between the pressure before the solenoid valve 30 (the first opening/closing valve) and the pressure after the solenoid valve is a difference ($\Delta Pix = Pd - PCI$) between the pressure Pd on a refrigerant upstream side of (before) the solenoid valve 30 which is detected by the discharge pressure sensor 42 and the radiator pressure PCI which is a pressure on a refrigerant downstream side of (after) the solenoid valve 30 which is detected by the radiator pressure sensor 47, and the difference is calculated by the controller 32.

(7-1) Bumping Countermeasure Control (No. 1) at Change from Heating Mode to Dehumidifying and Heating Mode or MAX Cooling Mode When the operation mode changes from the heating mode to the dehumidifying and heating mode or the MAX cooling mode, the refrigerant flowing from the outdoor heat exchanger 7 through the solenoid valve 21 to the accumulator 12 in the heating mode changes to a state of flowing from the outdoor heat exchanger 7 through the solenoid valve 17 to the receiver drier portion 14 (a receiver of the present invention). That is, the refrigerant accumulated in the accumulator 12 moves to the receiver drier portion 14. Therefore, when the number of revolution of the compressor 2 heightens after the mode is changed, the pressure in the accumulator 12 rapidly drops, and the bumping occurs to cause excessive liquid return to the compressor 2 or generate sound (noise).

To eliminate the problems, the controller 32 executes the bumping countermeasure control described below, when changing the operation mode from the heating mode to the dehumidifying and heating mode or the MAX cooling mode. When changing from the heating mode to the dehumidifying and heating mode or the MAX cooling mode, the controller 32 initially opens the solenoid valve 17 and closes the solenoid valve 21 to obtain a state where the refrigerant flowing out from the outdoor heat exchanger 7 flows through the receiver drier portion 14. Furthermore, the controller adjusts the number of revolution NC of the compressor 2 (executes control to decrease the number of revolution) and also shifts the valve position of the outdoor expansion valve 6 to the fully opened position so that the difference $\Delta Pdx$ between the pressure before the solenoid valve 40 and the pressure after the solenoid valve becomes not more than a predetermined value A (e.g., 0.2 MPa or the like).

When the controller adjusts the number of revolution NC of the compressor 2 to decrease the number of revolution, the discharge pressure Pd lowers, and when the controller fully opens the outdoor expansion valve 6, the outdoor heat exchanger pressure PXO rises. Consequently, the difference $\Delta Pdx$ (=Pd−PXO) between the pressure before the solenoid valve 40 and the pressure after the solenoid valve decreases. Then, when the pressure difference $\Delta Pdx$ is not more than a predetermined value A of FIG. 4, the controller 32 opens the solenoid valve 40, closes the solenoid valve 30, shifts the outdoor expansion valve 6 to a shutoff state, and shifts the control of the compressor 2 to control in the dehumidifying and heating mode or the MAX cooling mode, thereby shifting to an air conditioning operation of the dehumidifying and heating mode or the MAX cooling mode.

Here, in the above-mentioned control of the number of revolution NC of the compressor 2, a usual rising speed in increasing the number of revolution NC (Hz to be raised per unit time) is determined, but in this embodiment, as shown by a solid line L1 in FIG. 4, a rising speed of the number of revolution NC of the compressor 2 is adjusted to be lower than the above-mentioned usual rising speed (see a solid line L2 of FIG. 4) until the control shifts to the control in the dehumidifying and heating mode or the MAX cooling mode. Specifically, the controller decreases the Hz to be raised per unit time (the solid line L1 rises up from a predetermined number of revolution NC1 which will be described later, but actually, the number is not limited to NC1).

In this embodiment, when the difference ΔPdx between the pressure before the solenoid valve 40 and the pressure after the solenoid valve decreases as described above, the amount of the refrigerant to be sucked from the accumulator 12 into the compressor 2 decreases. Therefore, when changing from the heating mode in which the refrigerant moves from the accumulator 12 to the receiver drier portion 14 to the dehumidifying and heating mode (or the MAX cooling mode), there is inhibited the disadvantage that a large amount of refrigerant is sucked from the accumulator 12 into the compressor 2 and that the pressure in the accumulator 12 rapidly drops, and the bumping of the refrigerant in the accumulator 12 is prevented or inhibited.

In particular, the rising speed lowers until the control of the compressor 2 shifts to the control in the dehumidifying and heating mode or the MAX cooling mode, and hence the drop of the pressure in the accumulator 12 at the change of the mode is further inhibited. Furthermore, when the difference ΔPdx between the pressure before the solenoid valve 40 and the pressure after the solenoid valve becomes not more than the predetermined value A, the control of the compressor 2 shifts to the control in the dehumidifying and heating mode (the MAX cooling mode). Consequently, it is possible to accurately prevent or inhibit the occurrence of the bumping in the accumulator 12.

(7-2) Bumping Countermeasure Control (No. 2) at Change from Heating Mode to Dehumidifying and Heating Mode or MAX Cooling Mode Here, in the bumping countermeasure control (No. 1) of the above example, the controller 32 controls the number of revolution NC of the compressor 2 so that the difference ΔPdx between the pressure before the solenoid valve 40 and the pressure after the solenoid valve becomes not more than the predetermined value A, but the present invention is not limited to this example, and the controller may adjust the number of revolution NC of the compressor 2 to the predetermined number of revolution NC1 which is a previously determined low value (e.g., from 800 rpm to 1500 rpm in FIG. 4). The controller executes control so that the number of revolution NC of the compressor 2 becomes the low predetermined number of revolution NC1, and fully opens the outdoor expansion valve 6, thereby lowering the discharge pressure Pd and raising the outdoor heat exchanger pressure PXO. Consequently, the difference ΔPdx between the pressure before the solenoid valve 40 and the pressure after the solenoid valve decreases.

Then, also in this case, when the pressure difference ΔPdx becomes not more than the above-mentioned predetermined value A, the controller 32 opens the solenoid valve 40, closes the solenoid valve 30, and shifts the outdoor expansion valve 6 to the shutoff state. Simultaneously, the control of the compressor 2 shifts to the control in the dehumidifying and heating mode or the MAX cooling mode as shown by the solid line L2 in FIG. 4, thereby shifting to the air conditioning operation of the dehumidifying and heating mode or the MAX cooling mode. Also according to such bumping countermeasure control, it is possible to prevent or inhibit the occurrence of the bumping in the accumulator 12.

(7-3) Bumping Countermeasure Control (No. 3) at Change from Heating Mode to Dehumidifying and Heating Mode or MAX Cooling Mode It is to be noted that in the bumping countermeasure control (No. 2) of the above example, the controller shifts the control of the compressor 2 to the control in the dehumidifying and heating mode or the MAX cooling mode simultaneously with the shift of the outdoor expansion valve 6 to the shutoff state, but the present invention is not limited to the example. As shown by a solid line L3 in FIG. 4, after the start of the shift of the outdoor expansion valve 6 to the shutoff state, the controller 32 may confirm that the outdoor expansion valve 6 is shut off, before shifting the control of the compressor 2 to the control in the dehumidifying and heating mode or the MAX cooling mode. Also according to this bumping countermeasure control, it is possible to prevent or inhibit the occurrence of the bumping in the accumulator 12.

(7-4) Bumping Countermeasure Control (No. 4) at Change from Heating Mode to Dehumidifying and Heating Mode or MAX Cooling Mode Furthermore, in the bumping countermeasure control, the controller may stop the compressor 2 (also shown in FIG. 4). The controller stops the compressor 2 and fully opens the outdoor expansion valve 6, thereby lowering the discharge pressure Pd and raising the outdoor heat exchanger pressure PXO. Consequently, the difference Pdx ΔPdx between the pressure before the solenoid valve 40 and the pressure after the solenoid valve decreases. Then, also in this case, when the pressure difference ΔPdx becomes not more than the above-mentioned predetermined value A, the controller 32 opens the solenoid valve 40, closes the solenoid valve 30, and shifts the outdoor expansion valve 6 to the shutoff state. Simultaneously, the controller starts the compressor 2 and shifts the control of the compressor to the control in the dehumidifying and heating mode or the MAX cooling mode, thereby shifting to the air conditioning operation in the dehumidifying and heating mode or the MAX cooling mode. However, also in this case, as shown by a solid line L4 in FIG. 4, the rising speed of the number of revolution NC of the compressor 2 is lowered to be lower than the usual rising speed until the control shifts to the control in the dehumidifying and heating mode or the MAX cooling mode.

(7-5) Bumping Countermeasure Control (No. 5) at Change from Heating Mode to Dehumidifying and Heating Mode or MAX Cooling Mode Here, in the bumping countermeasure control (No. 4) of the above example, when the difference ΔPdx between the pressure before the solenoid valve 40 and the pressure after the solenoid valve becomes not more than the predetermined value A, the controller 32 opens the solenoid valve 40, closes the solenoid valve 30, and shifts the outdoor expansion valve 6 to the shutoff state, but the present invention is not limited to this example. When a predetermined time 1 (e.g., 10 seconds or the like in FIG. 4) elapses after the compressor 2 is stopped, the controller may open the solenoid valve 40, close the solenoid valve 30 and shift the outdoor expansion valve 6 to the shutoff state.

(7-6) Bumping Countermeasure Control (No. 6) at Change from Heating Mode to Dehumidifying and Heating Mode or MAX Cooling Mode It is to be noted that in the bumping countermeasure control (No. 4 and No. 5) of the above respective examples, the controller shifts the control of the compressor 2 to the control in the dehumidifying and heating mode or the MAX cooling mode simultaneously with the shift of the outdoor expansion valve 6 to the shutoff state, but the present invention is not limited to this example. The controller may confirm that the outdoor expansion valve 6 is shut off, before shifting the control of the compressor 2 to the control in the dehumidifying and heating mode or the MAX cooling mode. Also in this case, the rising speed of the number of revolution NC of the compressor 2 is lowered to be lower than the usual rising speed. Also according to such bumping countermeasure control, it is possible to accurately prevent or inhibit the occurrence of the bumping in the accumulator 12.

(7-7) Bumping Countermeasure Control (No. 7) at Change from Heating Mode to Dehumidifying and Heating Mode or MAX Cooling Mode Furthermore, in addition to the bumping countermeasure control (No. 5) of the above example, the controller may prohibit the increase of the number of revolution of the compressor 2 until a second predetermined time 2 (longer than the predetermined time 1 in the example, e.g., 20 seconds or the like) elapses after the difference ΔPdx between the pressure before the solenoid valve 40 and the pressure after the solenoid valve becomes not more than the predetermined value A (shown by a solid line L5 in FIG. 5). Consequently, it is possible to further effectively prevent or inhibit the occurrence of the bumping in the accumulator 12.

(7-8) Bumping Countermeasure Control (No. 8) at Change from Heating Mode to Dehumidifying and Heating Mode or MAX Cooling Mode Here, in the bumping countermeasure control (No. 2) of the above example, the controller controls the number of revolution NC of the compressor 2 so that the number becomes the predetermined number of revolution NC1 which is the previously determined low value, and fully opens the outdoor expansion valve 6, thereby reducing the difference Pdx between the pressure before the solenoid valve 40 and the pressure after the solenoid valve. When the pressure difference ΔPdx becomes not more than the above-mentioned predetermined value A, the controller 32 opens the solenoid valve 40, closes the solenoid valve 30, and shifts the outdoor expansion valve 6 to the shutoff state. Simultaneously, the controller shifts the control of the compressor 2 to the control in the dehumidifying and heating mode or the MAX cooling mode, thereby shifting to the air conditioning operation of the dehumidifying and heating mode or the MAX cooling mode. However, also in this case, as shown by a solid line L6 in FIG. 5, the rising speed of the number of revolution NC of the compressor 2 may be lowered to be lower than the usual rising speed (the solid line L2 in FIG. 4) until the control shifts to the control in the dehumidifying and heating mode or the MAX cooling mode. Also according to this bumping countermeasure control, it is possible to accurately prevent or inhibit the occurrence of the bumping in the accumulator 12.

(7-9) Bumping Countermeasure Control (No. 9) at Change from Heating Mode to Dehumidifying and Heating Mode or MAX Cooling Mode It is to be noted that in the bumping countermeasure control (No. 8) of the above example, the control of the compressor 2 shifts to the control in the dehumidifying and heating mode or the MAX cooling mode simultaneously with the shift of the outdoor expansion valve 6 to the shutoff state, but the present invention is not limited to this example. As shown by a solid line L7 in FIG. 5, the controller may confirm that the outdoor expansion valve 6 is shut off, before shifting the control of the compressor 2 to the control in the dehumidifying and heating mode or the MAX cooling mode. Also in this case, the rising speed of the number of revolution NC of the compressor 2 may be lowered to be lower than the usual rising speed (the solid line L3 in FIG. 4). Also according to this bumping countermeasure control, it is possible to accurately prevent or inhibit the occurrence of the bumping in the accumulator 12.

(8) Bumping Countermeasure Control at Change from Heating Mode to Dehumidifying and Heating Mode Next, description will be made as to examples of the bumping countermeasure control to be executed by the controller 32 when changing the operation mode of the vehicle air conditioning device 1 from the heating mode to the dehumidifying and heating mode, with reference to FIG. 6. A timing chart of FIG. 6 shows the difference ΔPdx between the pressure before the solenoid valve 40 (the second opening/closing valve) and the pressure after the solenoid valve, the outlet temperature (the above-mentioned temperature of the air to be blown out from the outlet 29 to the vehicle interior) detected by the outlet temperature sensor 41, the auxiliary heater temperature Tptc detected by the auxiliary heater temperature sensor 50, the number of revolution NC of the compressor 2, the valve position of the outdoor expansion valve 6, an output (an energization amount or an amount of heat to be generated) of the auxiliary heater 23, and states of the solenoid valve 40, the solenoid valve 30 (the first opening/closing valve), the solenoid valve 17 (the fourth opening/closing valve) and the solenoid valve 21 (the third opening/closing valve), when changing from the heating mode to the dehumidifying and heating mode.

(8-1) Bumping Countermeasure Control (No. 1) at Change from Heating Mode to Dehumidifying and Heating Mode In this example, when changing from the heating mode to the dehumidifying and heating mode, the controller 32 initially generates heat in the auxiliary heater 23 and increases its output (the energization amount or the amount of the heat to be generated). In this case, the controller 32 increases the output of the auxiliary heater 23 in the dehumidifying and heating mode up to a predetermined value D (FIG. 6) which is higher than a target value C (FIG. 6) of the output as much as a previously determined value. Consequently, the auxiliary heater temperature Tptc rises.

Figure 6:
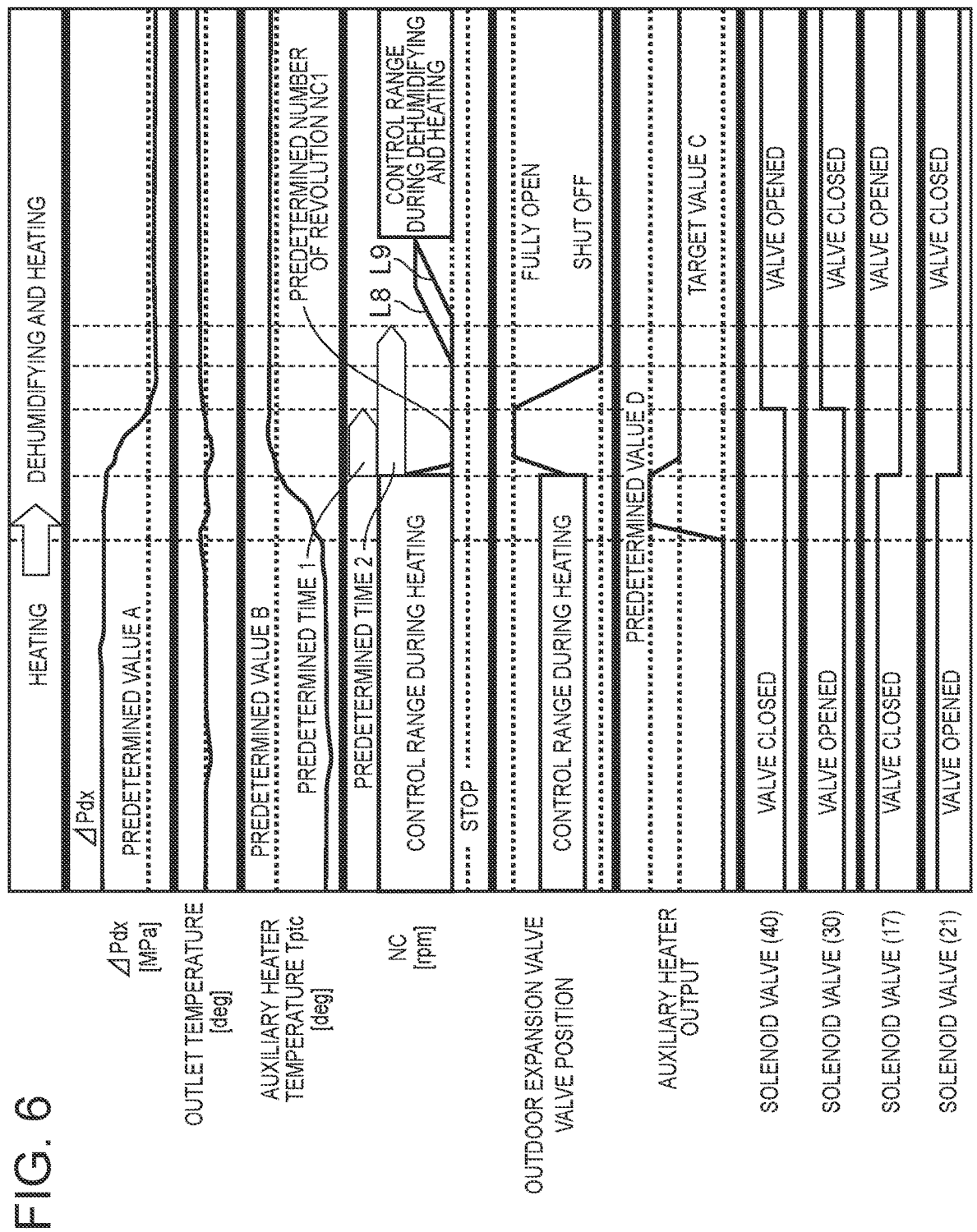
FIG. 6 is a timing chart of each device which is to explain still another example of the bumping countermeasure control to be executed by the controller of FIG. 2 when changing from the heating mode to the dehumidifying and heating mode.

Then, when the auxiliary heater temperature Tptc becomes not less than a predetermined value B of FIG. 6, the controller 32 opens the solenoid valve 17 and closes the solenoid valve 21. Consequently, the refrigerant circuit R changes to a state where the refrigerant flowing out from the outdoor heat exchanger 7 flows through the receiver drier portion 14 and then flows through the subcooling portion 16, the internal heat exchanger 19 and the indoor expansion valve 8 to the heat absorber 9. It is to be noted that the controller 32 then controls the output of the auxiliary heater 23 so that the output becomes the above-mentioned target value C in the dehumidifying and heating mode.

Furthermore, when the auxiliary heater temperature Tptc becomes not less than the predetermined value B, the controller 32 enlarges the valve position of the outdoor expansion valve 6 and adjusts the number of revolution NC of the compressor 2 (controls the number of revolution to decrease the number) so that the difference ΔPdx between the pressure before the solenoid valve 40 and the pressure after the solenoid valve becomes not more than the above-mentioned predetermined value A (0.2 MPa or the like) in the example, before switching between the solenoid valve 40 and the solenoid valve 30. The controller enlarges the valve position of the outdoor expansion valve 6, thereby increasing the outdoor heat exchanger pressure PXO, and the controller controls the number of revolution NC of the compressor 2 to decrease the number, thereby decreasing the discharge pressure Pd, so that the difference ΔPdx (=Pd−PXO) between the pressure before the solenoid valve 40 and the pressure after the solenoid valve decreases.

Then, when the pressure difference ΔPdx reduces to be not more than the predetermined value A of FIG. 6, the controller 32 opens the solenoid valve 40, closes the solenoid valve 30, shifts the outdoor expansion valve 6 to the shutoff state and shifts the control of the compressor 2 to the control in the dehumidifying and heating mode, thereby shifting to the air conditioning operation of the dehumidifying and heating mode. Furthermore, also in this case, the rising speed of the number of revolution NC of the compressor 2 is lowered to be lower than the usual rising speed, until the control shifts to the control in the dehumidifying and heating mode.

(8-2) Bumping Countermeasure Control (No. 2) at Change from Heating Mode to Dehumidifying and Heating Mode Here, in the above example, the controller 32 enlarges the valve position of the outdoor expansion valve 6 and controls the number of revolution NC of the compressor 2 so that the difference ΔPdx between the pressure before the solenoid valve 40 and the pressure after the solenoid valve becomes not more than the predetermined value A, but the present invention is not limited to the example, and the controller may adjust the valve position of the outdoor expansion valve 6 to a fully opened position (FIG. 6) and may adjust the number of revolution NC of the compressor 2 to the predetermined number of revolution NC1 (from 800 rpm to 1500 rpm in FIG. 6) which is the previously determined low value. The controller fully opens the outdoor expansion valve 6 and controls the number of revolution NC of the compressor 2 so that the number becomes the low predetermined number of revolution NC1, thereby increasing the outdoor heat exchanger pressure PXO and decreasing the discharge pressure Pd. Consequently, the difference ΔPdx between the pressure before the solenoid valve 40 and the pressure after the solenoid valve decreases. Then, also in this case, when the pressure difference ΔPdx reduces to be not more than the above-mentioned predetermined value A, the controller 32 opens the solenoid valve 40, closes the solenoid valve 30, and adjusts the outdoor expansion valve 6 to the shutoff state, thereby shifting to the air conditioning operation of the dehumidifying and heating mode.

(8-3) Bumping Countermeasure Control (No. 3) at Change from Heating Mode to Dehumidifying and Heating Mode Furthermore, in the bumping countermeasure control of the above example, when a predetermined time 1 (10 seconds or the like in FIG. 6) elapses after the controller 32 fully opens the outdoor expansion valve 6 and adjusts the number of revolution NC of the compressor 2 to the predetermined number of revolution NC1, the controller may open the solenoid valve 40, close the solenoid valve 30 and shift the outdoor expansion valve 6 to the shutoff state to shift to the air conditioning operation of the dehumidifying and heating mode.

(8-4) Bumping Countermeasure Control (No. 4) at Change from Heating Mode to Dehumidifying and Heating Mode Furthermore, in the bumping countermeasure control of the above example, when the controller 32 confirms that the outdoor expansion valve 6 is shut off after the controller 32 starts the shift of the outdoor expansion valve 6 to the fully opened position, the controller may shift the control of the compressor 2 to the control in the dehumidifying and heating mode as shown by a solid line L8 in FIG. 6.

(8-5) Bumping Countermeasure Control (No. 5) at Change from Heating Mode to Dehumidifying and Heating Mode Furthermore, in addition to the bumping countermeasure control of the above example, the controller may prohibit the increase of the number of revolution of the compressor 2 until a second predetermined time 2 (a time of, e.g., 20 seconds or the like which is longer than the predetermined time 1 in the example) after the number of revolution of the compressor 2 is adjusted to the predetermined number of revolution NC1 (shown by a solid line L9 in FIG. 6). In consequence, it is possible to further effectively prevent or inhibit the occurrence of the bumping in the accumulator 12.

The number of revolution NC of the compressor 2 decreases in the above-mentioned example (the bumping countermeasure control of (7)), and hence there is a risk that the temperature of the air blown out to the vehicle interior (the outlet temperature) lowers to deteriorate comfort. However, in this example (the bumping countermeasure control of (8)), when changing from the heating mode to the dehumidifying and heating mode, the controller 32 initially generates heat in the auxiliary heater 23. When the temperature Tptc of the auxiliary heater 23 becomes not less than the predetermined value B, the controller changes the solenoid valve 17 and the solenoid valve 21 to a state of sending, to the receiver drier portion 14, the refrigerant flowing out from the outdoor heat exchanger 7, and starts the control of the compressor 2 and the outdoor expansion valve 6 in the bumping countermeasure control. Therefore, as shown in FIG. 6, the outlet temperature is kept to be substantially constant also in a process of changing from the heating mode to the dehumidifying and heating mode. In consequence, it is possible to inhibit drop of the outlet temperature which is caused in changing from the heating mode to the dehumidifying and heating mode, and it is possible to achieve the comfortable air conditioning of the vehicle interior.

(9) Bumping Countermeasure Control at Change from Heating Mode to Cooling Mode

Next, description will be made as to examples of the bumping countermeasure control to be executed by the controller 32 when changing the operation mode of the vehicle air conditioning device 1 from the heating mode to the cooling mode, with reference to FIG. 7.

(9-1) Bumping Countermeasure Control (No. 1) at Change from Heating Mode to Cooling Mode Also when the operation mode changes from the heating mode to the cooling mode, the refrigerant flowing from the outdoor heat exchanger 7 through the solenoid valve 21 to the accumulator 12 in the heating mode changes to a state of flowing from the outdoor heat exchanger 7 through the solenoid valve 17 to the receiver drier portion 14 (the receiver). Therefore, when the number of revolution of the compressor 2 heightens after the mode is changed, the pressure in the accumulator 12 rapidly drops, and the bumping occurs to cause the excessive liquid return to the compressor 2 or generate the sound (the noise).

To eliminate the problems, the controller 32 executes the bumping countermeasure control described hereinafter also when changing the operation mode from the heating mode to the cooling mode. Also when changing from the heating mode to the cooling mode, the controller 32 initially opens the solenoid valve 17 and closes the solenoid valve 21 to change to a state where the refrigerant flowing out from the outdoor heat exchanger 7 flows through the receiver drier portion 14. Furthermore, the controller adjusts the number of revolution NC of the compressor 2 to the predetermined number of revolution NC1 (from 800 rpm to 1500 rpm in FIG. 7) which is a previously determined low value, and shifts the valve position of the outdoor expansion valve 6 to the fully opened position.

When the controller decreases the number of revolution NC of the compressor 2 to the predetermined number of revolution NC1, the discharge pressure Pd lowers, and when the controller fully opens the outdoor expansion valve 6, the outdoor heat exchanger pressure PXO rises. Consequently, the difference ΔPdx (=Pd−PXO) between the pressure before the solenoid valve 40 and the pressure after the solenoid valve decreases. Then, when the pressure difference ΔPdx becomes not more than a predetermined value A of FIG. 7, as shown by a solid line L10 in FIG. 7, the controller shifts the control of the compressor 2 to the control in the cooling mode, thereby shifting to an air conditioning operation of the cooling mode.

(9-2) Bumping Countermeasure Control (No. 2) at Change from Heating Mode to Cooling Mode Here, when the difference ΔPdx between the pressure before the solenoid valve 40 and the pressure after the solenoid valve becomes not more than the predetermined value A in the above example (9-1), the control of the compressor 2 shifts to the control in the cooling mode, but the present invention is not limited to this example. The controller 32 confirms that a predetermined time 3 (e.g., from 10 seconds to 60 seconds in FIG. 7) elapses after the number of revolution NC of the compressor 2 is decreased to the predetermined number of revolution NC1, and when the predetermined time 3 elapses, as shown by a solid line L11 in FIG. 7, the control of the compressor 2 may shift to the control in the cooling mode.

Figure 7:
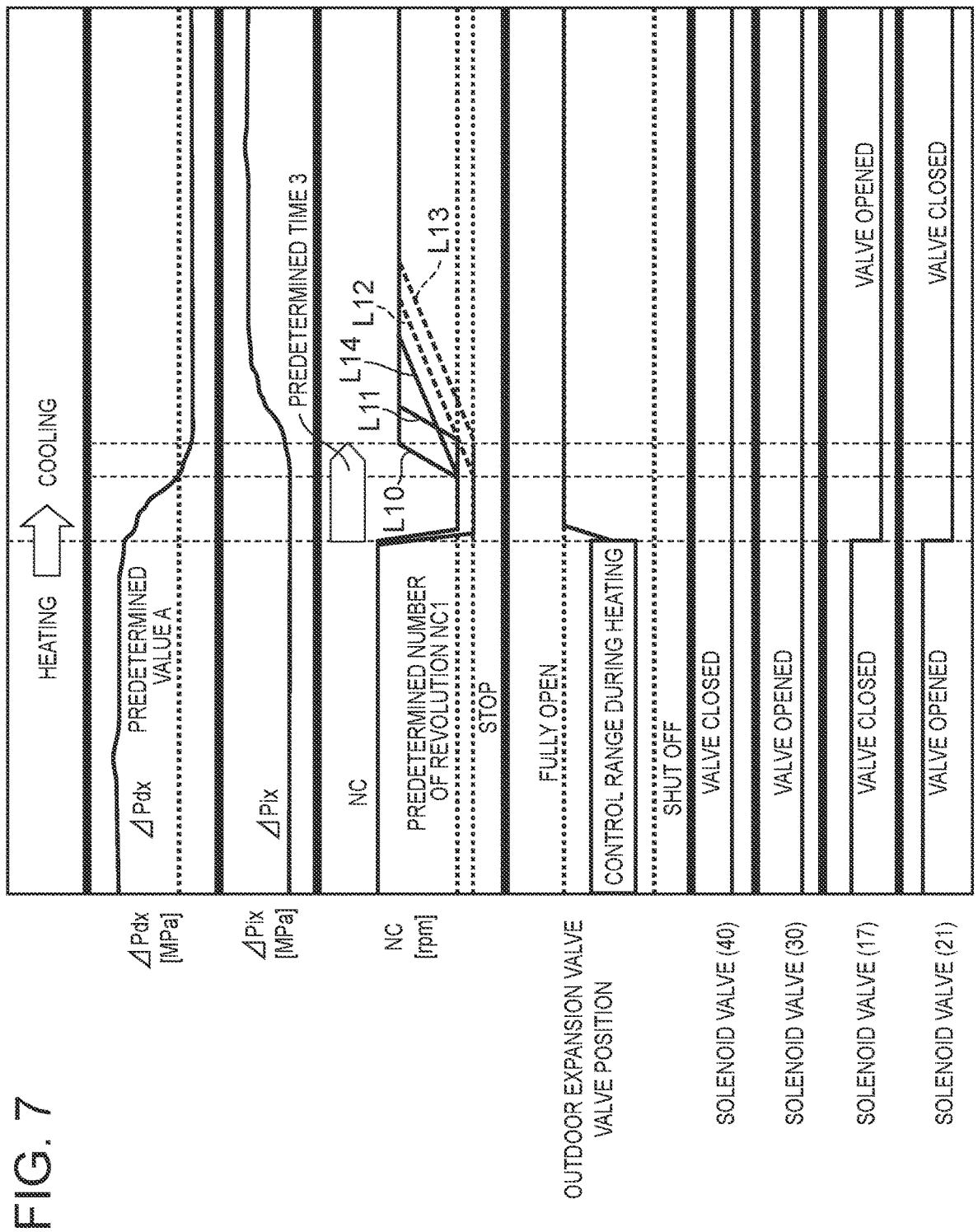
FIG. 7 is a timing chart of each device which is to explain an example of the bumping countermeasure control to be executed by the controller of FIG. 2 when changing from the heating mode to the cooling mode.

(9-3) Bumping Countermeasure Control (No. 3) at Change from Heating Mode to Cooling Mode Furthermore, in the bumping countermeasure control at the change from the heating mode to the cooling mode, the controller may stop the compressor 2 (also shown in FIG. 7). When the controller stops the compressor 2, the discharge pressure Pd lowers, and when the controller fully opens the outdoor expansion valve 6, the outdoor heat exchanger pressure PXO rises. Consequently, the difference ΔPdx (=Pd−PXO) between the pressure before the solenoid valve 40 and the pressure after the solenoid valve decreases. Then, also in this case, when the pressure difference ΔPdx becomes not more than the predetermined value A, the controller shifts the control of the compressor 2 to the control in the cooling mode, thereby shifting to the air conditioning operation of the cooling mode. Furthermore, in this case, as shown by a broken line L12 in FIG. 7, the rising speed of the number of revolution NC of the compressor 2 is lowered to be lower than the usual rising speed, until the control shifts to the control in the cooling mode.

(9-4) Bumping Countermeasure Control (No. 4) at Change from Heating Mode to Cooling Mode Here, when the difference ΔPdx between the pressure before the solenoid valve 40 and the pressure after the solenoid valve becomes not more than the predetermined value A in the above example (9-3), the control of the compressor 2 shifts to the control in the cooling mode, but the present invention is not limited to this example. The controller 32 confirms that the predetermined time 3 (e.g., from 10 seconds to 60 seconds in FIG. 7) elapses after the compressor 2 is stopped, and when the predetermined time 3 elapses, as shown by a solid line L13 in FIG. 7, the control of the compressor 2 may shift to the control in the cooling mode.

(9-5) Bumping Countermeasure Control (No. 5) at Change from Heating Mode to Cooling Mode Furthermore, in the bumping countermeasure control at the change from the heating mode to the cooling mode, the controller 32 may adjust the number of revolution NC of the compressor 2 so that the difference ΔPdx between the pressure before the solenoid valve 40 and the pressure after the solenoid valve becomes not more than the predetermined value A. Then, also in this case, when the pressure difference ΔPdx becomes not more than the predetermined value A, the controller shifts the control of the compressor 2 to the control in the cooling mode, thereby shifting to the air conditioning operation of the cooling mode. Furthermore, also in this case, as shown by a solid line L14 in FIG. 7, the rising speed of the number of revolution NC of the compressor 2 is lowered to be lower than the usual rising speed until the control shifts to the control in the cooling mode (the solid line L14 rises up from the predetermined number of revolution NC1, but actually, the number is not limited to NC1).

(9-6) Bumping Countermeasure Control (No. 6) at Change from Heating Mode to Cooling Mode Here, in the above example (9-5), when the difference ΔPdx between the pressure before the solenoid valve 40 and the pressure after the solenoid valve becomes not more than the predetermined value A, the control of the compressor 2 shifts to the control in the cooling mode, but the present invention is not limited to this example. The controller 32 confirms that the predetermined time 3 (from 10 seconds to 60 seconds in FIG. 7) elapses after the compressor 2 is stopped, and when the predetermined time 3 elapses, the control of the compressor 2 shifts to the control in the cooling mode. Also in this case, the rising speed of the number of revolution NC of the compressor 2 may be lowered to be lower than the usual rising speed until the control shifts to the control in the cooling mode.

Thus, the difference ΔPdx between the pressure before the solenoid valve 40 and the pressure after the solenoid valve is decreased, thereby decreasing the amount of the refrigerant to be sucked from the accumulator 12 into the compressor 2. Therefore, also when the heating mode in which the refrigerant moves from the accumulator 12 to the receiver drier portion 14 changes to the cooling mode, there is inhibited the disadvantage that a large amount of refrigerant is sucked from the accumulator 12 into the compressor 2 and that the pressure in the accumulator 12 rapidly drops, and the bumping of the refrigerant in the accumulator 12 is prevented or inhibited.

In particular, when the rising speed of the number of revolution NC is lowered until the control of the compressor 2 shifts to the control in the cooling mode as in the above examples (9-3) to (9-6), the drop of the pressure in the accumulator 12 at the change of the mode is further inhibited. Furthermore, as in the respective examples of (9), when the difference ΔPdx between the pressure before the solenoid valve 40 and the pressure after the solenoid valve becomes not more than the predetermined value A, the controller shifts the control of the compressor 2 to the control in the cooling mode. Alternatively, after the predetermined time 3 elapses, the controller shifts the control. Consequently, it is possible to accurately prevent or inhibit the occurrence of the bumping in the accumulator 12.

(10) Bumping Countermeasure Control at Change from Heating Mode to Dehumidifying and Cooling Mode Next, description will be made as to examples of the bumping countermeasure control to be executed by the controller 32 when changing the operation mode of the vehicle air conditioning device 1 from the heating mode to the dehumidifying and cooling mode, with reference to FIG. 8.

(10-1) Bumping Countermeasure Control (No. 1) at Change from Heating Mode to Dehumidifying and Cooling Mode Also when the operation mode changes from the heating mode to the dehumidifying and cooling mode, the refrigerant flowing from the outdoor heat exchanger 7 through the solenoid valve 21 to the accumulator 12 in the heating mode changes to a state of flowing from the outdoor heat exchanger 7 through the solenoid valve 17 to the receiver drier portion 14 (the receiver). Therefore, when the number of revolution of the compressor 2 heightens after the mode is changed, the pressure in the accumulator 12 rapidly drops, and the bumping occurs to cause the excessive liquid return to the compressor 2 or generate the sound (the noise).

To eliminate such problems, also when changing the operation mode from the heating mode to the dehumidifying and cooling mode, the controller 32 executes the bumping countermeasure control mentioned below. Also when changing from the heating mode to the dehumidifying and cooling mode, the controller 32 initially opens the solenoid valve 17 and closes the solenoid valve 21 to obtain the state where the refrigerant flowing out from the outdoor heat exchanger 7 flows into the receiver drier portion 14. Furthermore, the controller adjusts the number of revolution NC of the compressor 2 to the predetermined number of revolution NC1 that is a previously determined low value (from 800 rpm to 1500 rpm in FIG. 8), and shifts the control of the valve position of the outdoor expansion valve 6 to the control in the dehumidifying and cooling mode.

When the number of revolution NC of the compressor 2 decreases to the predetermined number of revolution NC1, the discharge pressure Pd lowers, and when the outdoor expansion valve 6 is controlled to have a comparatively large valve position in the dehumidifying and cooling mode, the outdoor heat exchanger pressure PXO rises. Consequently, the difference ΔPdx (=Pd−PXO) between the pressure before the solenoid valve 40 and the pressure after the solenoid valve decreases. Furthermore, when the pressure difference ΔPdx becomes not more than a predetermined value A of FIG. 8, as shown by a solid line L15 in FIG. 8, the controller shifts the control of the compressor 2 to the control in the dehumidifying and cooling mode, thereby shifting to an air conditioning operation of the dehumidifying and cooling mode.

(10-2) Bumping Countermeasure Control (No. 2) at Change from Heating Mode to Dehumidifying and Cooling Mode Here, in the above example (10-1), when the difference ΔPdx between the pressure before the solenoid valve 40 and the pressure after the solenoid valve becomes not more than the predetermined value A, the control of the compressor 2 shifts to the control in the dehumidifying and cooling mode, but the present invention is not limited to the example. The controller 32 may confirm that a predetermined time 4 (e.g., from 10 seconds to 30 seconds in FIG. 8) elapses after the number of revolution NC of the compressor 2 is decreased to the predetermined number of revolution NC1, and when the predetermined time 4 elapses, the control of the compressor 2 may shift to the control in the dehumidifying and cooling mode as shown by a solid line L16 in FIG. 8.

Figure 8:
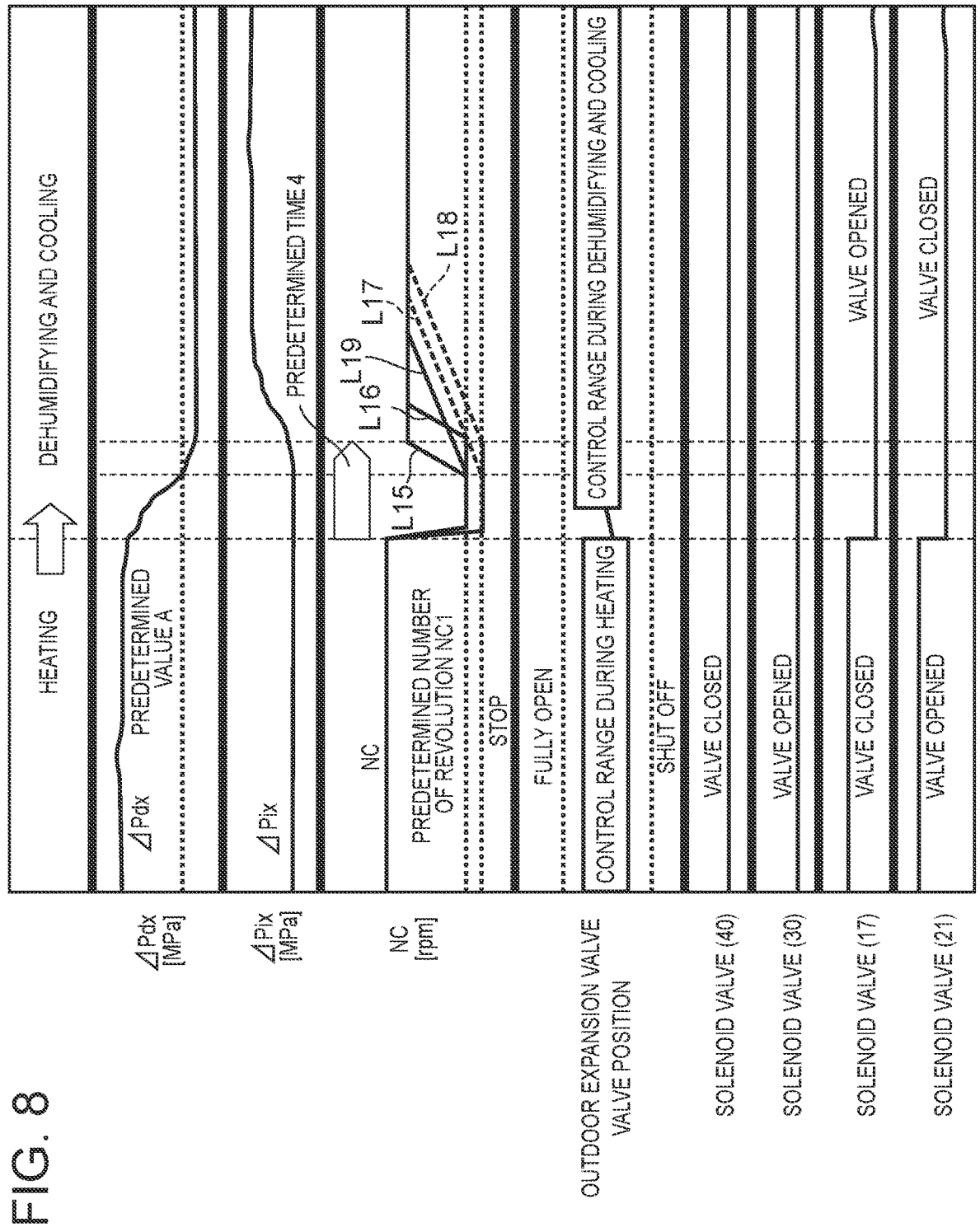
FIG. 8 is a timing chart of each device which is to explain an example of the bumping countermeasure control to be executed by the controller of FIG. 2 when changing from the heating mode to the dehumidifying and cooling mode.

(10-3) Bumping Countermeasure Control (No. 3) at Change from Heating Mode to Dehumidifying and Cooling Mode Furthermore, in the bumping countermeasure control at the change from the heating mode to the dehumidifying and cooling mode, the controller may stop the compressor 2 (also shown in FIG. 8). When the controller stops the compressor 2, the discharge pressure Pd lowers, and when the valve position of the outdoor expansion valve 6 enlarges, the outdoor heat exchanger pressure PXO rises. Consequently, the difference ΔPdx (=Pd−PXO) between the pressure before the solenoid valve 40 and the pressure after the solenoid valve decreases. Then, also in this case, when the pressure difference ΔPdx becomes not more than the predetermined value A, the controller shifts the control of the compressor 2 to the control in the dehumidifying and cooling mode, thereby shifting to the air conditioning operation of the dehumidifying and cooling mode. Additionally, in this case, as shown by a broken line L17 in FIG. 8, the rising speed of the number of revolution NC of the compressor 2 is lowered to be lower than the usual rising speed until the control shifts to the control in the dehumidifying and cooling mode.

(10-4) Bumping Countermeasure Control (No. 4) at Change from Heating Mode to Dehumidifying and Cooling Mode Here, when the difference ΔPdx between the pressure before the solenoid valve 40 and the pressure after the solenoid valve becomes not more than the predetermined value A in the above example (10-3), the control of the compressor 2 shifts to the control in the dehumidifying and cooling mode, but the present invention is not limited to the example. The controller 32 may confirm that the predetermined time 4 (from 10 seconds to 30 seconds in FIG. 8) elapses after the compressor 2 is stopped, and when the predetermined time 4 elapses, the controller may shift the control of the compressor 2 to the control in the dehumidifying and cooling mode as shown by a solid line L18 in FIG. 8.

(10-5) Bumping Countermeasure Control (No. 5) at Change from Heating Mode to Dehumidifying and Cooling Mode Furthermore, in the bumping countermeasure control at the change from the heating mode to the dehumidifying and cooling mode, the controller 32 may adjust the number of revolution NC of the compressor 2 so that the difference ΔPdx between the pressure before the solenoid valve 40 and the pressure after the solenoid valve becomes not more than the predetermined value A. Then, also in this case, when the pressure difference ΔPdx becomes not more than the predetermined value A, the controller shifts the control of the compressor 2 to the control in the dehumidifying and cooling mode, thereby shifting to the air conditioning operation of the dehumidifying and cooling mode. Additionally, also in this case, as shown by a solid line L19 in FIG. 8, the rising speed of the number of revolution NC of the compressor 2 is lowered to be lower than the usual rising speed, until the control shifts to the control in the dehumidifying and cooling mode (the solid line L19 rises up from the predetermined number of revolution NC1, but actually, the number is not limited to NC1).

(10-6) Bumping Countermeasure Control (No. 6) at Change from Heating Mode to Dehumidifying and Cooling Mode Here, when the difference ΔPdx between the pressure before the solenoid valve 40 and the pressure after the solenoid valve becomes not more than the predetermined value A in the above example (10-5), the control of the compressor 2 shifts to the control in the dehumidifying and cooling mode, but the present invention is not limited to the example. The controller 32 may confirm that the predetermined time 4 (from 10 seconds to 30 seconds in FIG. 8) elapses after the compressor 2 is stopped, and when the predetermined time 4 elapses, the control of the compressor 2 may shift to the control in the dehumidifying and cooling mode. Also in this case, the rising speed of the number of revolution NC of the compressor 2 may be lowered to be lower than the usual rising speed, until the control shifts to the control in the dehumidifying and cooling mode.

Thus, when the controller decreases the difference ΔPdx between the pressure before the solenoid valve 40 and the pressure after the solenoid valve, the amount of the refrigerant to be sucked from the accumulator 12 into the compressor 2 decreases. Consequently, also when shifting the heating mode in which the refrigerant moves from the accumulator 12 to the receiver drier portion 14 to the dehumidifying and cooling mode, there is inhibited the disadvantage that a large amount of refrigerant is sucked from the accumulator 12 into the compressor 2 and that the pressure in the accumulator 12 rapidly drops, and the bumping of the refrigerant in the accumulator 12 is prevented or inhibited.

In particular, when the rising speed of the number of revolution NC is lowered until the control of the compressor 2 shifts to the control in the dehumidifying and cooling mode as in the above examples (10-3) to (10-6), the drop of the pressure in the accumulator 12 at the change of the mode is further inhibited. Furthermore, as in the respective examples of (10), when the difference ΔPdx between the pressure before the solenoid valve 40 and the pressure after the solenoid valve becomes not more than the predetermined value A, the control of the compressor 2 shifts to the control in the dehumidifying and cooling mode, or when the predetermined time 4 elapses, the control shifts. In this case, it is possible to accurately prevent or inhibit the occurrence of the bumping in the accumulator 12.

It is to be noted that in the embodiment, the present invention is applied to the vehicle air conditioning device 1 to switch between and execute the respective operation modes of the heating mode, the dehumidifying and heating mode, the dehumidifying and cooling mode, the cooling mode and the MAX cooling mode, but the present invention is not limited to the embodiments. In item 1 to item 6, the present invention is also effective for the vehicle air conditioning device to switch between and execute the heating mode, the dehumidifying and heating mode and the MAX cooling mode, and in item 7, the present invention is also effective for the vehicle air conditioning device to switch between and execute the heating mode and the dehumidifying and heating mode. Furthermore, in item 8 to item 11, the present invention is also effective for the vehicle air conditioning device to switch between and execute the heating mode and the cooling mode, and according to item 12 to item 15, the present invention is also effective for the vehicle air conditioning device to switch between and execute the heating mode and the dehumidifying and cooling mode.

Furthermore, the present invention is not limited to the switching control between the operation modes described in the embodiment, and appropriate conditions may be set by employing one, any combination or all of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, and the presence/absence of the requirement for the dehumidifying of the vehicle interior, in accordance with the capability and use environment of the vehicle air conditioning device.

Additionally, the auxiliary heating device is not limited to the auxiliary heater 23 described in the embodiment, and a heating medium circulating circuit which circulates a heating medium heated by a heater to heat air in an air flow passage, a heater core which circulates radiator water heated by an engine or the like may be utilized. Furthermore, the constitutions of the refrigerant circuit R which are described in the above respective embodiments are not limited thereto, and needless to say, the constitutions are changeable without departing from the gist of the present invention.

DESCRIPTION OF REFERENCE NUMERALS

1 vehicle air conditioning device
2 compressor
3 air flow passage
4 radiator
6 outdoor expansion valve
7 outdoor heat exchanger
8 indoor expansion valve
9 heat absorber
12 accumulator
14 receiver drier portion (a receiver)
17 solenoid valve (a fourth opening/closing valve)
21 solenoid valve (a third opening/closing valve)
23 auxiliary heater (an auxiliary heating device)
27 indoor blower (a blower fan)
28 air mix damper
30 solenoid valve (a first opening/closing valve)
40 solenoid valve (a second opening/closing valve)
31 outlet changing damper
32 controller (a control device)
35 bypass pipe
45 bypass device
R refrigerant circuit

The invention claimed is:
1. A vehicle air conditioning device comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior,
an outdoor expansion valve to decompress the refrigerant flowing out from the radiator and flowing into the outdoor heat exchanger,
a first opening/closing valve interposed between a discharge side of the compressor and an inlet side of the radiator, a bypass pipe branching on an upstream side of the first opening/closing valve, passing the radiator and the outdoor expansion valve, to send, to the outdoor heat exchanger, the refrigerant discharged from the compressor, a second opening/closing valve disposed in the bypass pipe, an auxiliary heating device to heat the air to be supplied from the air flow passage to the vehicle interior, an accumulator connected to a refrigerant suction side of the compressor, a receiver connected to a refrigerant downstream side of the outdoor heat exchanger, and a control device configured to switch between and execute:

a heating mode to open the first opening/closing valve, close the second opening/closing valve, send, to the radiator, the refrigerant discharged from the compressor, let the refrigerant radiate heat, decompress, in the outdoor expansion valve, the refrigerant from which the heat has been radiated, let the refrigerant absorb heat in the outdoor heat exchanger, send, to the accumulator, the refrigerant by which the heat has been absorbed, and suck the refrigerant from the accumulator into the compressor, a dehumidifying and heating mode to shut off the outdoor expansion valve, close the first opening/closing valve, open the second opening/closing valve, send, to the outdoor heat exchanger, the refrigerant discharged from the compressor by the bypass pipe, let the refrigerant radiate heat, send, to the receiver, the refrigerant from which the heat has been radiated, decompress the refrigerant, let the refrigerant absorb heat in the heat absorber, and generate heat in the auxiliary heating device, and a maximum cooling mode to shut off the outdoor expansion valve, close the first opening/closing valve, open the second opening/closing valve, send, to the outdoor heat exchanger, the refrigerant discharged from the compressor by the bypass pipe, let the refrigerant radiate heat, send, to the receiver, the refrigerant from which the heat has been radiated, decompress the refrigerant, and then let the refrigerant absorb heat in the heat absorber, the control device being further configured to:

when changing from the heating mode to the dehumidifying and heating mode or the maximum cooling mode, change to a state of sending, to the receiver, the refrigerant flowing out from the outdoor heat exchanger, then control a number of revolution of the compressor or stop the compressor to reduce a difference between a pressure before the second opening/closing valve and a pressure after the second opening/closing valve, then open the second opening/closing valve, close the first opening/closing valve, shut off the outdoor expansion valve, and shift the control of the compressor to control in the dehumidifying and heating mode or the maximum cooling mode.

2. The vehicle air conditioning device according to claim 1, wherein the control device is further configured to:

adjust the number of revolution of the compressor so that the difference between the pressure before the second opening/closing valve and the pressure after the second opening/closing valve becomes not more than a predetermined value, and when the pressure difference becomes not more than the predetermined value, open the second opening/closing valve, close the first opening/closing valve, shut off the outdoor expansion valve, shift the control of the compressor to the control in the dehumidifying and heating mode or the maximum cooling mode, and lower a rising speed of the number of revolution of the compressor until the control shifts.

3. The vehicle air conditioning device according to claim 1, wherein the control device is further configured to:

adjust the number of revolution of the compressor to a previously determined low value, and when the difference between the pressure before the second opening/closing valve and the pressure after the second opening/closing valve becomes not more than the predetermined value, open the second opening/closing valve, close the first opening/closing valve, shut off the outdoor expansion valve, and shift the control of the compressor to the control in the dehumidifying and heating mode or the maximum cooling mode, or when the outdoor expansion valve shuts off, shift the control of the compressor to the control in the dehumidifying and heating mode or the maximum cooling mode.

4. The vehicle air conditioning device according to claim 1, wherein the control device is further configured to:

when the control device stops the compressor and the difference between the pressure before the second opening/closing valve and the pressure after the second opening/closing valve becomes not more than a predetermined value or when a predetermined time elapses after the compressor is stopped, open the second opening/closing valve, close the first opening/closing valve, shut off the outdoor expansion valve, and shift the control of the compressor to the control in the dehumidifying and heating mode or the maximum cooling mode, or when the outdoor expansion valve shuts off, shift the control of the compressor to the control in the dehumidifying and heating mode or the maximum cooling mode, and lower a rising speed of the number of revolution of the compressor until the control shifts.

5. The vehicle air conditioning device according to claim 4, wherein the control device is further configured to prohibit increase of the number of revolution of the compressor until a second predetermined time elapses after the difference between the pressure before the second opening/closing valve and the pressure after the second opening/closing valve becomes not more than the predetermined value.

6. The vehicle air conditioning device according to claim 1, wherein the control device is further configured to:

when the control device has adjusted the number of revolution of the compressor to a previously determined low value and the difference between the pressure before the second opening/closing valve and the pressure after the second opening/closing valve becomes not more than a predetermined value, or when a predetermined time elapses after the number of revolution of the compressor is adjusted to the low value, open the second opening/closing valve, close the first opening/closing valve, shut off the outdoor expansion valve, and shift the control of the compressor to the control in the dehumidifying and heating mode or the maximum cooling mode, or when the outdoor expansion valve shuts off, shift the control of the compressor to the control in the dehumidifying and heating mode or the maximum cooling mode, and lower a rising speed of the number of revolution of the compressor until the control shifts.

7. The vehicle air conditioning device of the invention according to claim 1, wherein the control device is further configured to:
when changing from the heating mode to the dehumidifying and heating mode, generate heat in the auxiliary heating device, and
when a temperature of the auxiliary heating device becomes not less than a predetermined value, change to a state of sending, to the receiver, the refrigerant flowing out from the outdoor heat exchanger, and enlarge a valve position of the outdoor expansion valve.

* * * * *